US010858965B2

(12) United States Patent
Mitsutani

(10) Patent No.: US 10,858,965 B2
(45) Date of Patent: Dec. 8, 2020

(54) VALVE TIMING ADJUSTMENT DEVICE

(71) Applicant: DENSO CORPORATION, Kariya (JP)

(72) Inventor: Tetsuro Mitsutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/502,333

(22) Filed: Jul. 3, 2019

(65) Prior Publication Data

US 2019/0323392 A1 Oct. 24, 2019

Related U.S. Application Data

(63) Continuation of application No. PCT/JP2018/001405, filed on Jan. 18, 2018.

(30) Foreign Application Priority Data

| Jan. 19, 2017 | (JP) | 2017-007514 |
| Mar. 7, 2017 | (JP) | 2017-042607 |
| Apr. 21, 2017 | (JP) | 2017-084456 |

(51) Int. Cl.
   *F01L 1/344* (2006.01)
   *F01M 1/12* (2006.01)
   (Continued)

(52) U.S. Cl.
   CPC ............. *F01L 1/344* (2013.01); *F01L 1/3442* (2013.01); *F01M 1/12* (2013.01); *F01M 1/14* (2013.01);
   (Continued)

(58) Field of Classification Search
   USPC .......................................... 123/90.17, 90.15
   See application file for complete search history.

(56) References Cited

U.S. PATENT DOCUMENTS

| 6,889,126 B2 | 5/2005 | Komiyama et al. |
| 8,752,514 B2 | 6/2014 | Schulze et al. |

(Continued)

FOREIGN PATENT DOCUMENTS

| DE | 10 2010 019 004 | 11/2011 |
| DE | 10 2015 208 453 | 6/2016 |

(Continued)

OTHER PUBLICATIONS

U.S. Appl. No. 16/502,361 of Mitsutani, filed Jul. 3, 2019 (52 pages).

(Continued)

*Primary Examiner* — Patrick Hamo
*Assistant Examiner* — Wesley G Harris
(74) *Attorney, Agent, or Firm* — Nixon & Vanderhye P.C.

(57) ABSTRACT

A retard supply passage connects between a hydraulic oil supply source and a retard chamber through a hydraulic oil controller. An advance supply passage connects between the hydraulic oil supply source and an advance chamber through the hydraulic oil controller. A drain passage and a drain passage connect the retard chamber and the advance chamber to an oil discharge portion, respectively. A recycle passage connects the drain passage and the drain passage to the retard supply passage and the advance supply passage, respectively. A recycle check valve enables only a flow of hydraulic oil from the drain passages toward the retard supply passage and the advance supply passage in the recycle passage. The recycle passage is connected to the drain passages at an inside of the hydraulic oil controller.

15 Claims, 16 Drawing Sheets

(51) Int. Cl.
  *F01M 1/14*  (2006.01)
  *F01M 1/16*  (2006.01)
  *F02D 13/02*  (2006.01)
  *F16K 15/02*  (2006.01)

(52) U.S. Cl.
  CPC ........... *F01M 1/16* (2013.01); *F02D 13/0219* (2013.01); *F16K 15/02* (2013.01); *F01L 2001/3443* (2013.01); *F01L 2001/3445* (2013.01); *F01L 2001/34423* (2013.01); *F01L 2001/34426* (2013.01); *F01L 2001/34433* (2013.01)

(56) References Cited

U.S. PATENT DOCUMENTS

| | | | | |
|---|---|---|---|---|
| 9,587,528 | B2* | 3/2017 | Kaufmann | F16K 11/10 |
| 2011/0266479 | A1* | 11/2011 | Gautier | F01L 1/3442 |
| | | | | 251/282 |
| 2012/0152195 | A1* | 6/2012 | Schulze | F01L 1/34409 |
| | | | | 123/90.17 |
| 2014/0311594 | A1* | 10/2014 | Hutzelmann | F16K 17/105 |
| | | | | 137/490 |
| 2015/0218977 | A1* | 8/2015 | Hofmann | F01L 1/3442 |
| | | | | 123/90.17 |
| 2017/0022854 | A1 | 1/2017 | Takada | |
| 2019/0107014 | A1* | 4/2019 | Smith | F01L 1/3442 |

FOREIGN PATENT DOCUMENTS

| | | |
|---|---|---|
| JP | 50-106723 | 1/1949 |
| JP | 57-93670 | 11/1955 |
| JP | 2001-99341 | 4/2001 |
| JP | 2016-56851 | 4/2016 |
| WO | 2018/135573 | 7/2018 |
| WO | 2018/135577 | 7/2018 |
| WO | 2018/135584 | 7/2018 |
| WO | 2018/164022 | 9/2018 |
| WO | 2018/194076 | 10/2018 |

OTHER PUBLICATIONS

U.S. Appl. No. 16/502,376 of Mitsutani, filed Jul. 3, 2019 (35 pages).
U.S. Appl. No. 16/502,404 of Mitsutani, et al. filed Jul. 3, 2019 (100 pages).
U.S. Appl. No. 16/542,460 of Mitsutani, filed Aug. 16, 2019 (66 pages).
U.S. Appl. No. 16/555,122 of Mitsutani, filed Aug. 29, 2019 (61 pages).

* cited by examiner

VALVE TIMING ADJUSTMENT DEVICE

CROSS REFERENCE TO RELATED APPLICATIONS

This application is a continuation application of International Patent Application No. PCT/JP2018/001405 filed on Jan. 18, 2018, which designated the U.S. and claims the benefit of priority from Japanese Patent Application No. 2017-7514 filed on Jan. 19, 2017, Japanese Patent Application No. 2017-42607 filed on Mar. 7, 2017 and Japanese Patent Application No. 2017-84456 filed on Apr. 21, 2017. The entire disclosures of all of the above applications are incorporated herein by reference.

TECHNICAL FIELD

The present disclosure relates to a valve timing adjustment device.

BACKGROUND

There is known a valve timing adjustment device that is installed in a drive force transmission path for transmitting a drive force from a drive shaft to a driven shaft of an internal combustion engine and adjusts a valve timing of valves that are driven to open and close by the driven shaft. In a case where the valve timing adjustment device is a hydraulic type, the valve timing adjustment device includes: a housing that is rotated synchronously with one of the drive shaft and the driven shaft; and a vane rotor that is fixed to an end portion of the other one of the drive shaft and the driven shaft. The valve timing adjustment device rotates the vane rotor in an retarding direction or an advancing direction by supplying hydraulic oil to one of a retard chamber and an advance chamber defined by the vane rotor in the inside of the housing. The hydraulic oil, which is supplied to the retard chamber and the advance chamber, is controlled by a hydraulic oil control valve.

SUMMARY

According to the present disclosure, there is provided a valve timing adjustment device configured to adjust a valve timing of a valve of an internal combustion engine. The valve timing adjustment device includes a phase converter, a hydraulic oil supply source, a hydraulic oil controller, an oil discharge portion, a retard supply passage, an advance supply passage, a drain passage and a recycle passage.

The phase converter has a retard chamber and an advance chamber.

The hydraulic oil supply source is configured to supply hydraulic oil to the retard chamber and the advance chamber.

The hydraulic oil controller is configured to control the hydraulic oil supplied from the hydraulic oil supply source to the retard chamber and the advance chamber.

The oil discharge portion is configured to receive the hydraulic oil discharged from the retard chamber or the advance chamber.

The retard supply passage connects between the hydraulic oil supply source and the retard chamber through the hydraulic oil controller.

The advance supply passage connects between the hydraulic oil supply source and the advance chamber through the hydraulic oil controller.

The drain passage connects the retard chamber and the advance chamber to the oil discharge portion.

The recycle passage connects the drain passage to the retard supply passage and the advance supply passage. As a result, the hydraulic oil from the retard chamber and the advance chamber can be reused.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
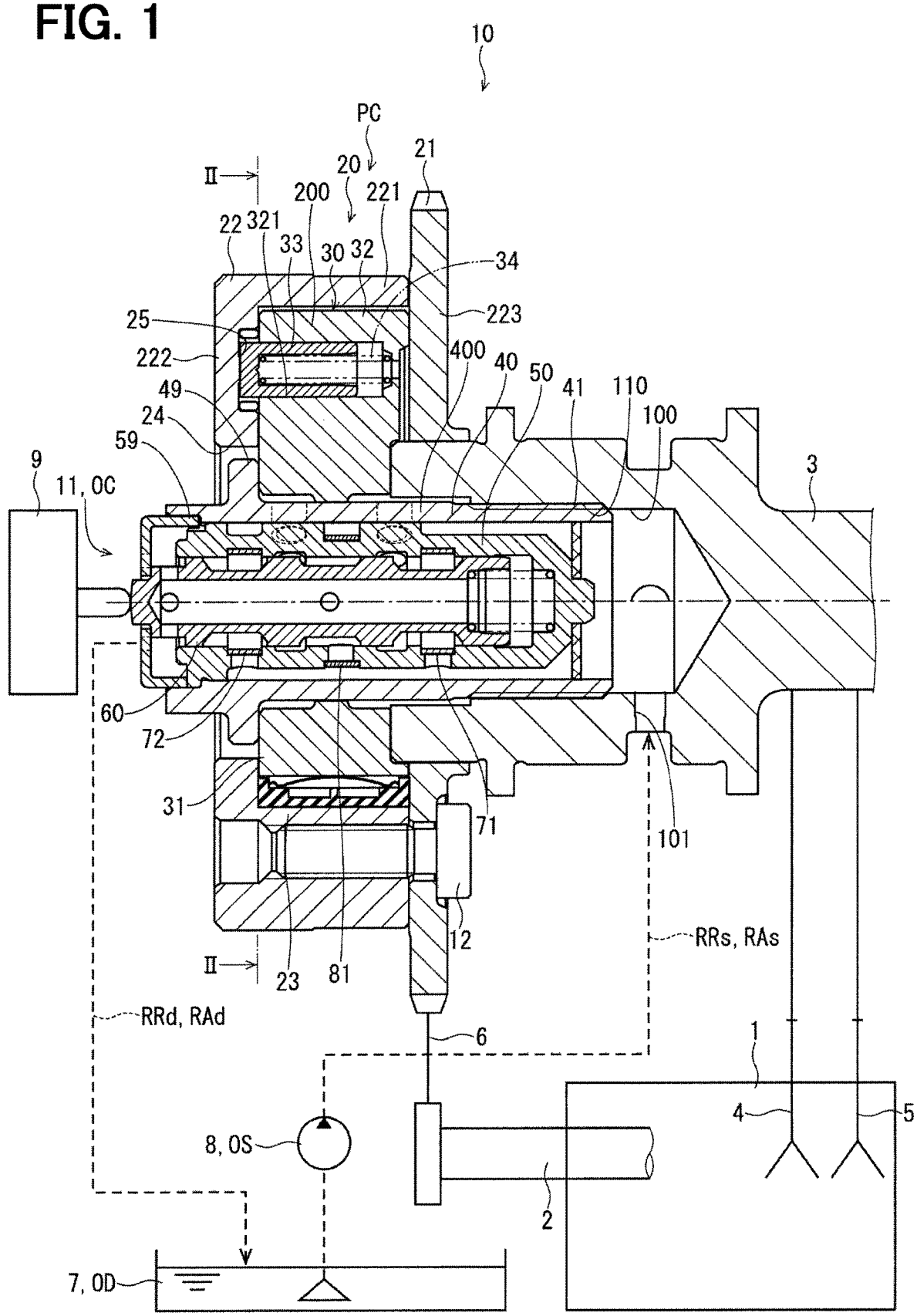
FIG. 1 is a cross-sectional view illustrating a valve timing adjustment device according to a first embodiment.

In a previously proposed valve timing adjustment device, a sleeve of a hydraulic oil control valve includes: a supply opening that conducts the hydraulic oil supplied from a hydraulic oil supply source; a retard opening that is communicating with the retard chamber; an advance opening that is communicated with the advance chamber; a retard drain opening that conducts the hydraulic oil discharged from the retard chamber toward the outside; an advance drain opening that conducts the hydraulic oil discharged from the advance chamber toward the outside; a retard recycle opening that conducts the hydraulic oil returning from the retard chamber to the hydraulic oil control valve; and an advance recycle opening that conducts the hydraulic oil returning from the advance chamber to the hydraulic oil control valve. The two recycle openings allow reuse of the hydraulic oil from the retard chamber and the hydraulic oil from the advance chamber.

In the previously proposed valve timing adjustment device, two recycle passages, which extend through the recycle openings, are connected to a retard supply passage passing through the retard opening and an advance supply passage passing through the advance opening outside the hydraulic oil control valve, respectively. The two drain openings are formed independently of the two recycle openings, the retard opening, and the advance opening. Thus, many openings need to be formed at the hydraulic oil control valve as described above. As a result, a size of the hydraulic oil control valve may possibly be increased in a direction, along which the openings are axially arranged one after the other along the hydraulic oil control valve.

According to one aspect of the present disclosure, there is provided a valve timing adjustment device configured to adjust a valve timing of a valve of an internal combustion engine. The valve timing adjustment device includes a phase converter, a hydraulic oil supply source, a hydraulic oil controller, an oil discharge portion, a retard supply passage, an advance supply passage, a drain passage, a recycle passage, and a recycle check valve.

The phase converter has a retard chamber and an advance chamber.

The hydraulic oil supply source is configured to supply hydraulic oil to the retard chamber and the advance chamber.

The hydraulic oil controller is configured to control the hydraulic oil supplied from the hydraulic oil supply source to the retard chamber and the advance chamber.

The oil discharge portion is configured to receive the hydraulic oil discharged from the retard chamber or the advance chamber.

The retard supply passage connects between the hydraulic oil supply source and the retard chamber through the hydraulic oil controller.

The advance supply passage connects between the hydraulic oil supply source and the advance chamber through the hydraulic oil controller.

The drain passage connects the retard chamber and the advance chamber to the oil discharge portion.

The recycle passage connects the drain passage to the retard supply passage and the advance supply passage. As a result, the hydraulic oil from the retard chamber and the advance chamber can be reused.

The recycle check valve enables only a flow of the hydraulic oil from the drain passage side toward the retard supply passage and the advance supply passage in the recycle passage. In this way, it is possible to limit the flow of the hydraulic oil from each supply passage side toward the drain passage, i.e., it is possible to limit the backflow of the hydraulic oil. Therefore, the responsiveness of the valve timing adjustment device can be improved.

In the present disclosure, the recycle passage is connected to the drain passages at the inside of the hydraulic oil controller. Thus, by forming the recycle passage at the inside of the hydraulic oil controller, it is possible to eliminate an opening of the recycle passage. Also, by forming the drain passage at the retard openings and advance openings, it is possible to eliminate openings of the drain passages. In this way, the number of openings of the passages formed at the outer wall of the hydraulic oil controller can be reduced. Thereby, a size of the hydraulic oil controller can be reduced in the direction, along which the openings are axially arranged one after the other along the hydraulic oil controller.

Hereinafter, a valve timing adjustment device according to a plurality of embodiments of the present disclosure will be described with reference to the drawings. Components that are substantially the same in the plurality of embodiments are denoted by the same reference signs and will not be described redundantly. Moreover, components that are substantially the same in the plurality of embodiments exert the same or similar effects.

First Embodiment

Figure 2:
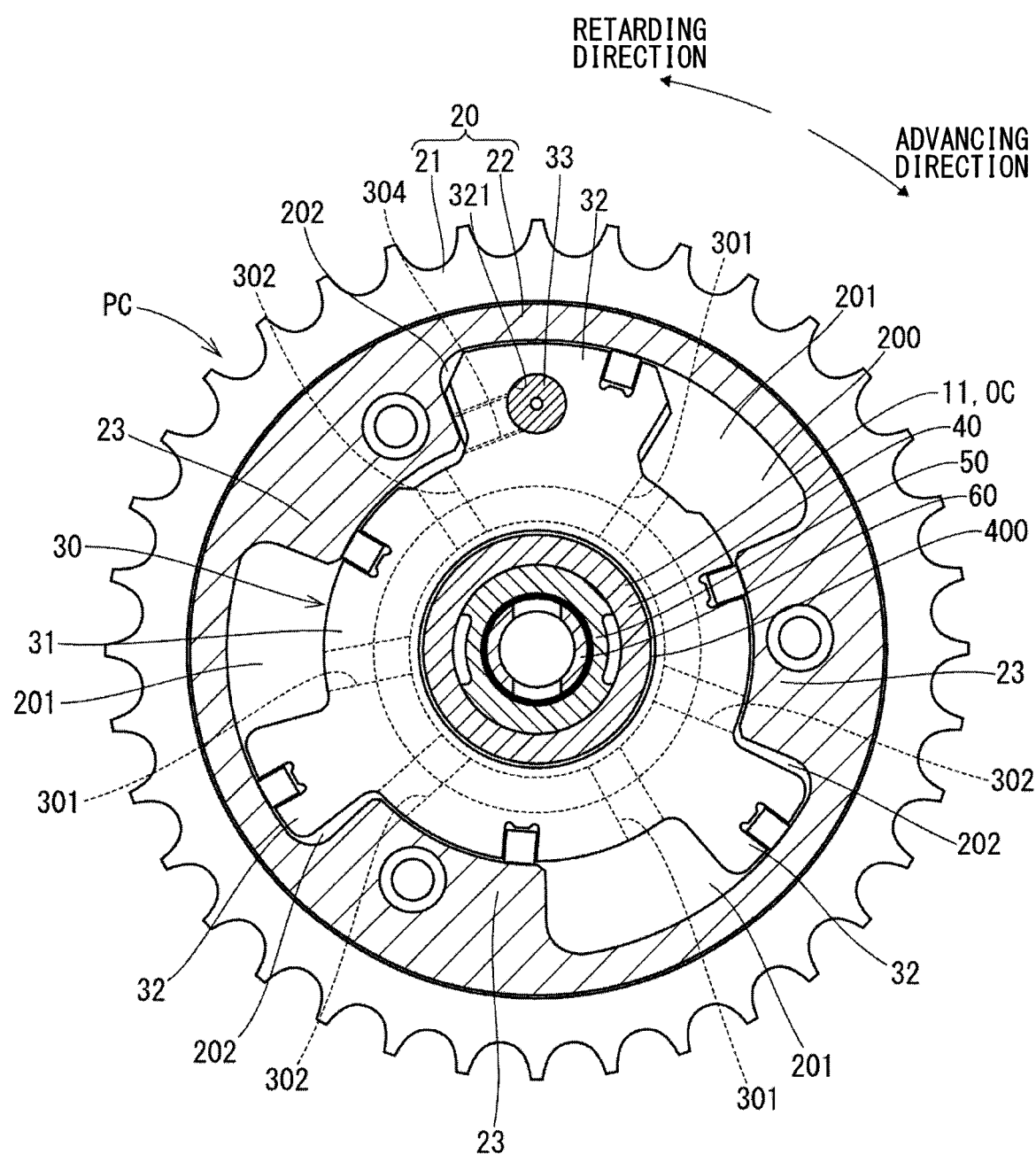
FIG. 2 is a cross-sectional view taken along line II-II in FIG. 1.

FIGS. 1 and 2 illustrate a valve timing adjustment device according to a first embodiment. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 among the intake valves 4 and exhaust valves 5 driven to open and close by the camshaft 3. The valve timing adjustment device 10 is installed in a drive force transmission path that extends from the crankshaft 2 to the camshaft 3. The crankshaft 2 corresponds to a drive shaft. The camshaft 3 corresponds to a driven shaft. The intake valves 4 and the exhaust valves 5 correspond to valves.

The structure of the valve timing adjustment device 10 will be described with reference to FIGS. 1 and 2.

The valve timing adjustment device 10 includes a phase converter PC, a hydraulic oil supply source OS, a hydraulic oil controller OC, an oil discharge portion OD, a retard supply passage RRs, an advance supply passage RAs, a retard drain passage RRd, an advance drain passage RAd (the drain passages RRd, RAd serving as drain passages), a recycle passage Rre, a retard supply check valve 71, an advance supply check valve 72, and a recycle check valve 81.

The phase converter PC has a housing 20 and a vane rotor 30.

The housing 20 has a gear portion 21 and a case 22. The case 22 has a tubular portion 221 and plate portions 222, 223. The tubular portion 221 is shaped in a tubular form. The plate portion 222 is integrally formed with the tubular portion 221 such that the plate portion 222 closes one end of the tubular portion 221. The plate portion 223 is formed to close the other end of the tubular portion 221. In this way, a space 200 is formed in an inside of the housing 20. The plate portion 223 is fixed to the tubular portion 221 by bolts 12. The gear portion 21 is formed at an outer periphery of the plate portion 223.

The plate portion 223 is fitted to an end portion of the camshaft 3. The camshaft 3 rotatably supports the housing 20. A chain 6 is wound around the gear portion 21 and the crankshaft 2. The gear portion 21 is rotated synchronously with the crankshaft 2.

The case 22 forms a plurality of partition wall portions 23 that inwardly project from the tubular portion 221 in the radial direction. An opening 24 is formed at a center of the plate portion 222 of the case 22 such that the opening 24 opens to a space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. The space 200, which is formed in the inside of the housing 20, is divided into retard chambers 201 and advance chambers 202 by the vanes 32. That is, the housing 20 forms the retard chambers 201 and the advance chambers 202 between the housing 20 and the vane rotor 30. Each retard chamber 201 is positioned on one circumferential side of the corresponding vane 32. Each advance chamber 202 is positioned on the other circumferential side of the corresponding vane 32. The vane rotor 30 rotates relative to the housing 20 in a retarding direction or an advancing direction according to an oil pressure in the respective retard chambers 201 and an oil pressure in the respective advance chambers 202.

In the present embodiment, the hydraulic oil controller OC is a hydraulic oil control valve 11. The hydraulic oil control valve 11 includes a sleeve 400 and a spool 60.

In the present embodiment, the hydraulic oil control valve 11 is placed at the center part of the housing 20 and the vane rotor 30 (see FIGS. 1 and 2). In other words, the hydraulic oil control valve 11 is placed such that at least a portion of the hydraulic oil control valve 11 is located in the inside of the housing 20.

The sleeve 400 has an outer sleeve 40 and an inner sleeve 50.

The outer sleeve 40 is shaped in a substantially cylindrical tubular form and is made of a material, which includes, for example, iron and has a relatively high hardness. An inner peripheral wall of the outer sleeve 40 is shaped in a substantially cylindrical form.

Figure 3:
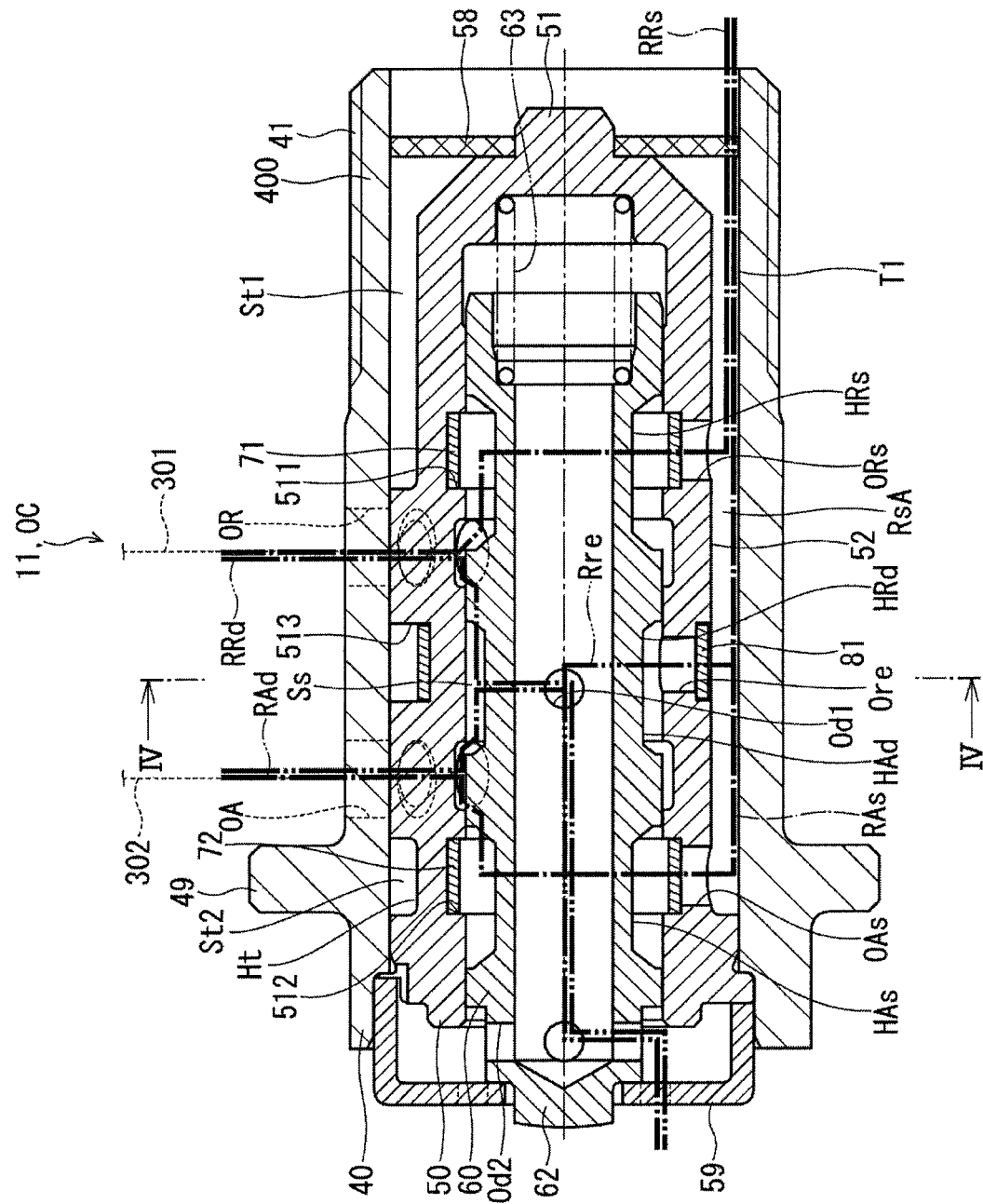
FIG. 3 is a cross-sectional view illustrating a hydraulic oil control valve of the valve timing adjustment device according to the first embodiment.

As illustrated in FIG. 3, a threaded portion 41 is formed at an outer peripheral wall of one end portion of the outer sleeve 40. A retaining portion 49 is formed at the other end portion of the outer sleeve 40 such that the retaining portion 49 is shaped in a ring form and outwardly extends from an outer peripheral wall of the other end portion of the outer sleeve 40 in the radial direction.

A shaft hole 100 and a plurality of supply holes 101 are formed at the end portion of the camshaft 3, which is located on the valve timing adjustment device 10 side. The shaft hole 100 is formed to extend in an axial direction of the camshaft 3 from a center part of an end surface of the camshaft 3, which is located on the valve timing adjustment device 10 side. Each of the supply holes 101 is formed such that the supply hole 101 inwardly extend from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 41 of the outer sleeve 40.

The outer sleeve 40 is inserted through the inside of the boss 31 of the vane rotor 30 and is fixed to the camshaft 3 such that the threaded portion 41 of the outer sleeve 40 is engaged with the shaft-side threaded portion 110 of the camshaft 3. At this time, the retaining portion 49 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 49. The outer sleeve 40 is thus installed to the center of the vane rotor 30.

In the present embodiment, the hydraulic oil supply source OS is an oil pump 8. The oil discharge portion OD is an oil pan 7. The oil pump 8 is connected to the supply holes 101. The oil pump 8 suctions the hydraulic oil stored in the oil pan 7 and supplies the suctioned hydraulic oil to the supply holes 101. As a result, the hydraulic oil flows into the shaft hole 100.

The inner sleeve 50 is shaped in a substantially cylindrical tubular form and is made of a material, which includes, for example, aluminum and has a relatively low hardness. Specifically, the inner sleeve 50 is made of the material that has the hardness lower than the hardness of the outer sleeve 40. An inner peripheral wall and an outer peripheral wall of the inner sleeve 50 are respectively shaped in a substantially cylindrical form. The inner sleeve 50 is subjected to surface hardening using anodized aluminum or the like, so that a surface layer of the inner sleeve 50 has a hardness that is higher than a hardness of a base material of the inner sleeve 50.

As illustrated in FIG. 3, the inner sleeve 50 is placed at the inside of the outer sleeve 40 such that an outer peripheral wall of the inner sleeve 50 is fitted to the inner peripheral wall of the outer sleeve 40. The inner sleeve 50 is immovable relative to the outer sleeve 40.

A sleeve sealing portion 51 is formed at one end of the inner sleeve 50. The sleeve sealing portion 51 closes the one end of the inner sleeve 50.

The spool 60 is shaped in a substantially cylindrical tubular form and is made of, for example, metal.

The spool 60 is placed in an inside of the inner sleeve 50 such that an outer peripheral wall of the spool 60 is slidable along the inner peripheral wall of the inner sleeve 50 to enable reciprocation of the spool 60 in the axial direction.

A spool sealing portion 62 is formed at one end of the spool 60. The spool sealing portion 62 closes the one end of the spool 60.

A variable volume space Sv is formed between the sleeve sealing portion 51 and the other end of the spool 60 at the inside of the inner sleeve 50. A volume of the variable volume space Sv changes when the spool 60 is moved relative to the inner sleeve 50 in the axial direction. Specifically, the sleeve sealing portion 51 forms the variable volume space Sv, the volume of which changes, between the sleeve sealing portion 51 and the spool 60.

A spring 63 is installed in the variable volume space Sv. The spring 63 is a coil spring. One end of the spring 63 contacts the sleeve sealing portion 51, and other end of the spring 63 contacts the other end portion of the spool 60. The spring 63 urges the spool 60 in a direction away from the sleeve sealing portion 51.

A retaining portion 59 is placed on the radially inner side of the other end portion of the outer sleeve 40. The retaining portion 59 is shaped in a bottomed tubular form. An outer peripheral wall of the retaining portion 59 is fitted to the inner peripheral wall of the outer sleeve 40. A hole is formed at a center of a bottom of the retaining portion 59, and the spool sealing portion 62 is installed in an inside of this hole.

The bottom of the retaining portion 59 is configured to retain the one end of the spool 60. The retaining portion 59 can limit movement of the spool 60 toward a side that is opposite to the sleeve sealing portion 51. In this way, removal of the spool 60 from the inside of the inner sleeve 50 is limited.

The spool 60 is movable in the axial direction from a position, at which the spool 60 contacts the retaining portion 59, to a position, at which the spool 60 contacts the sleeve sealing portion 51. Specifically, a movable range of the spool 60 relative to the sleeve 400 extends from the position, at which the spool 60 contacts the retaining portion 59 (see FIGS. 3 and 7), to the position, at which the spool 60 contacts the sleeve sealing portion 51 (see FIG. 11). Hereinafter, the movable range of the spool 60 is referred to as a stroke range.

As illustrated in FIG. 3, the sleeve sealing portion 51 side end region of the inner sleeve 50 has an outer diameter that is smaller than an inner diameter of the outer sleeve 40. In this way, an annular space St1, which is shaped in a substantially annular form, is formed between an outer peripheral wall of the sleeve sealing portion 51 side end region of the inner sleeve 50 and the inner peripheral wall of the outer sleeve 40.

Moreover, an annular recess Ht is formed at the inner sleeve 50. The annular recess Ht, which is shaped in an annular form, is radially inwardly recessed at a portion of the outer peripheral wall of the inner sleeve 50, which corresponds to the retaining portion 49. In this way, an annular space St2, which is shaped in an annular form, is formed between the annular recess Ht and the inner peripheral wall of the outer sleeve 40.

A passage groove 52 is also formed at the inner sleeve 50. The passage groove 52 is radially inwardly recessed at the outer peripheral wall of the inner sleeve 50 and extends in the axial direction of the inner sleeve 50 (see FIGS. 3 and 5). The passage groove 52 forms an axial supply passage RsA. Specifically, the axial supply passage RsA is formed to extend in the axial direction of the sleeve 400 at an interface T1 between the outer sleeve 40 and the inner sleeve 50. One end of the axial supply passage RsA is connected to the annular space St1, and the other end of the axial supply passage RsA is connected to the annular space St2.

Limiting grooves 511, 512 are formed at the inner sleeve 50. The limiting groove 511, which is shaped in an annular form, is radially outwardly recessed at a portion of the inner peripheral wall of the inner sleeve 50, which corresponds to an end portion of the annular space St1. The limiting groove 512, which is shaped in an annular form, is radially outwardly recessed at a portion of the inner peripheral wall of the inner sleeve 50, which corresponds to the annular recess Ht.

A movement limiting portion 513 is formed at the inner sleeve 50. The movement limiting portion 513 is an annular recess that is radially inwardly recessed at a portion of the outer peripheral wall of the inner sleeve 50, which is located between the limiting groove 511 and the limiting groove 512. As a result, a circumferential part of the movement limiting portion 513 is connected to the passage groove 52.

The sleeve 400 has a plurality of retard supply openings ORs, a plurality of advance supply openings OAs, a plurality of retard openings OR, a plurality of advance openings OA, and a plurality of recycle openings Ore.

Each retard supply opening ORs extends in the radial direction of the sleeve 400 and connects the limiting groove 511 of the inner sleeve 50 to the annular space St1 and the axial supply passage RsA. The plurality of retard supply openings ORs is arranged one after the other in the circumferential direction of the inner sleeve 50.

Each advance supply opening OAs extends in the radial direction of the sleeve 400 and connects the limiting groove 512 of the inner sleeve 50 to the annular space St2 and the axial supply passage RsA. The plurality of advance supply openings OAs is arranged one after the other in the circumferential direction of the inner sleeve 50.

Each retard opening OR extends in the radial direction of the sleeve 400 and connects the space, which is located at the inside of the inner sleeve 50, to the space, which is located at the outside of the outer sleeve 40. The plurality of the retard openings OR is arranged one after the other in the circumferential direction of the sleeve 400. Each retard opening OR is communicated with the corresponding retard chamber 201 through a corresponding retard passage 301.

Each advance opening OA extends in the radial direction of the sleeve 400 and connects the space, which is located at the inside of the inner sleeve 50, to the space, which is located at the outside of the outer sleeve 40. The advance opening OA is formed on the retaining portion 49 side of the retard openings OR. The plurality of the advance openings OA is arranged one after the other in the circumferential direction of the sleeve 400. Each advance opening OA is communicated with the corresponding advance chamber 202 through a corresponding advance passage 302.

Each recycle opening Ore extends in the radial direction of the sleeve 400 and connects the space, which is located at the inside of the inner sleeve 50, to the movement limiting portion 513 and the axial supply passage RsA. The number of recycle openings Ore is four, and these recycle openings Ore are arranged one after the other in the circumferential direction of the inner sleeve 50 (see FIG. 4).

The spool 60 has a retard supply recess HRs, a retard drain recess HRd, an advance drain recess HAd, an advance supply recess HAs, and a plurality of drain openings Od1, Od2.

The retard supply recess HRs, the retard drain recess HRd, the advance drain recess HAd and the advance supply recess HAs are respectively shaped in an annular form and radially inwardly recessed from the outer peripheral wall of the spool 60. The retard supply recess HRs, the retard drain recess HRd, the advance drain recess HAd and the advance supply recess HAs are arranged one after the other in this order in the axial direction of the spool 60. The retard drain recess HRd and the advance drain recess HAd are formed integrally. The retard drain recess HRd and the advance drain recess HAd form a specific space Ss relative to the inner peripheral wall of the inner sleeve 50. Specifically, the spool 60 forms the specific space Ss between the spool 60 and the sleeve 400.

Each drain opening Od1 communicates the space, which is located at the inside of the spool 60, to the retard drain recess HRd and the advance drain recess HAd, i.e., the specific space Ss. At the spool sealing portion 62 side end region of the spool 60, each drain opening Od2 communicates the space, which is located at the inside of the spool 60, to the space, which is located at the outside of the spool 60. The number of the drain openings Od1 is two, and these two drain openings Od1 are arranged one after the other at equal intervals in the circumferential direction of the spool 60 (see FIG. 4). The number of the drain openings Od2 is, for example, four, and these drain openings Od2 are arranged one after the other at equal intervals in the circumferential direction of the spool 60.

The retard supply passage RRs connects the oil pump 8 to the retard chambers 201 through the hydraulic oil control valve 11. The advance supply passage RAs connects the oil pump 8 to the advance chambers 202 through the hydraulic oil control valve 11. The retard drain passage RRd, which serves as the drain passage, connects the retard chambers 201 to the oil pan 7. The advance drain passage RAd, which serves as the drain passage, connects the advance chambers 202 to the oil pan 7.

The retard supply passage RRs connects the oil pump 8 to the retard chambers 201 through the supply holes 101, the shaft hole 100, the annular space St1, the axial supply passage RsA, the retard supply openings ORs, the limiting groove 511, the retard supply recess HRs, the retard openings OR and the retard passages 301.

The advance supply passage RAs connects between the oil pump 8 and the advance chambers 202 through the supply holes 101, the shaft hole 100, the annular space St1, the axial supply passage RsA, the advance supply openings OAs, the limiting groove 512, the advance supply recess HAs, the advance openings OA, and the advance passages 302.

The retard drain passage RRd connects the retard chambers 201 to the oil pan 7 through the retard passages 301, the retard openings OR, the retard drain recess HRd and the drain openings Od1, Od2.

The advance drain passage RAd connects the advance chambers 202 to the oil pan 7 through the advance passages 302, the advance openings OA, the advance drain recess HAd and the drain openings Od1, Od2.

Thus, a portion of each of the retard supply passage RRs, the advance supply passage RAs, the retard drain passage RRd and the advance drain passage RAd is formed at the inside of the hydraulic oil control valve 11.

The axial supply passage RsA extends in the axial direction of the sleeve 400 in the advance supply passage RAs. Specifically, the sleeve 400 has the axial supply passage RsA that extends in the axial direction of the sleeve 400 in the advance supply passage RAs.

The recycle passage Rre connects the retard drain passage RRd and the advance drain passage RAd (serving as the drain passages) to the retard supply passage RRs and the advance supply passage RAs.

Figure 4:
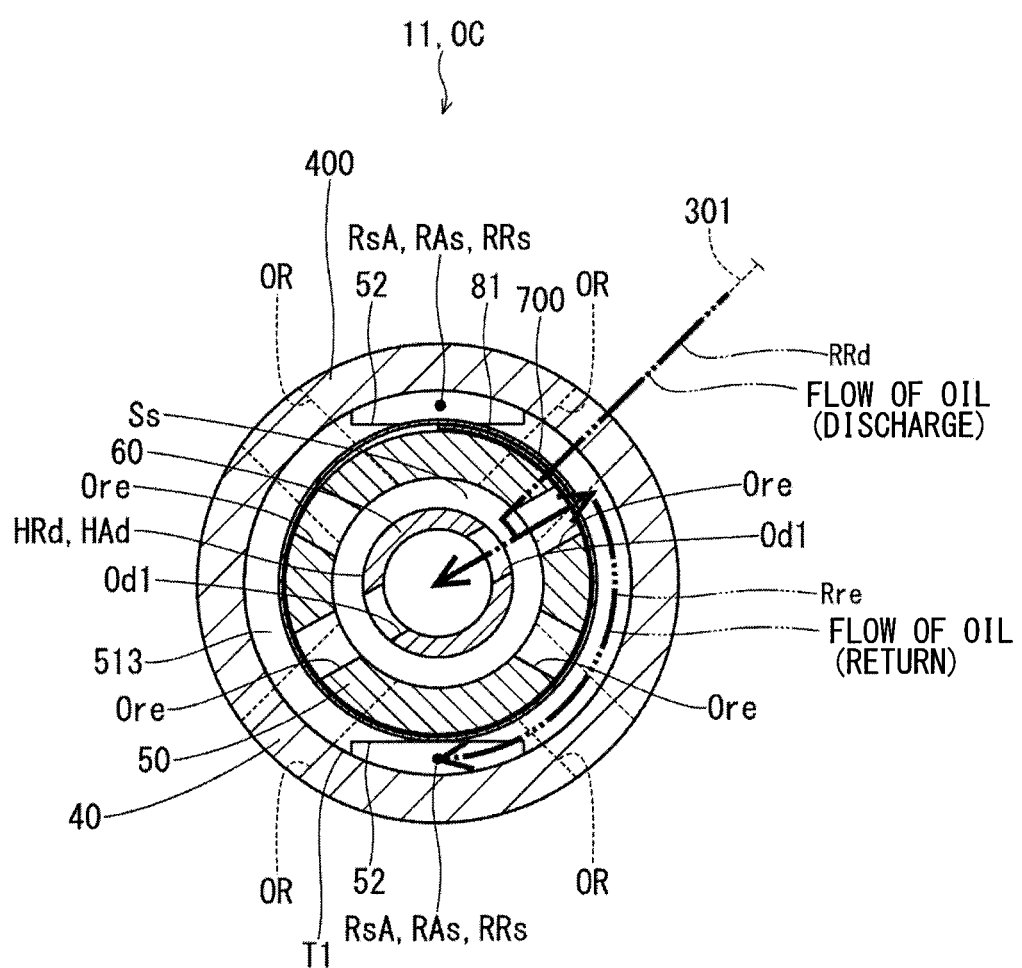
FIG. 4 is a cross-sectional view taken along line IV-IV in FIG. 3.

As illustrated in FIGS. 3 and 4, the recycle passage Rre extends from the specific space Ss to the retard supply passage RRs and the advance supply passage RAs, i.e., the axial supply passage RsA through the recycle openings Ore and the movement limiting portion 513.

The retard drain passage RRd and the advance drain passage RAd (serving as the drain passages) are connected to the space, which is located at the inside of the spool 60, through the retard passages 301, the retard openings OR, the advance passages 302, the advance openings OA, the specific space Ss and the drain openings Od1.

As illustrated in FIG. 4, each drain opening Od1 is connected to the specific space Ss in the drain passage and extends from the specific space Ss in the radial direction of the sleeve 400 or the spool 60. Each recycle opening Ore is connected to the specific space Ss in the recycle passage Rre and extends from the specific space Ss toward the side that is opposite to the drain opening Od1. The recycle passage Rre is connected to the retard drain passage RRd and the advance drain passage RAd at the specific space Ss.

As illustrated in FIGS. 3 and 4, at least a portion of each drain opening Od1 is formed to overlap with the recycle opening Ore in the axial direction of the sleeve 400 or the spool 60.

Moreover, each drain opening Od1 is formed at the spool 60 such that the drain opening Od1 extends from the specific space Ss toward the inner side in the radial direction of the sleeve 400 or the spool 60.

Each recycle opening Ore is formed at the inner sleeve 50 such that the recycle opening Ore extends from the specific space Ss toward the outer side in the radial direction of the sleeve 400 or the spool 60.

When the spool 60 is in contact with the retaining portion 59 (see FIGS. 3, 7, and 8), i.e., when the spool 60 is positioned at one end of the stroke range, the spool 60 opens the retard openings OR. Thereby, the oil pump 8 is communicated with the retard chambers 201 through the supply holes 101, the shaft hole 100, the annular space St1, the axial supply passage RsA, the retard supply openings ORs, the limiting groove 511, the retard supply recess HRs, the retard openings OR and the retard passages 301 of the retard supply passage RRs. As a result, the hydraulic oil can be supplied from the oil pump 8 to the retard chambers 201 through the retard supply passage RRs.

Moreover, at this time, the advance chambers 202 are communicated with the oil pan 7 through the advance passages 302, the advance openings OA, the advance drain recess HAd and the drain openings Od1, Od2 of the advance drain passage RAd. As a result, the hydraulic oil can be discharged from the advance chambers 202 to the oil pan 7 through the advance drain passage RAd.

When the spool 60 is positioned between the retaining portion 59 and the sleeve sealing portion 51 (see FIGS. 9 and 10), i.e., when the spool 60 is positioned in the middle of the stroke range, the oil pump 8 is communicated with the advance chambers 202 through the supply holes 101, the shaft hole 100, the annular space St1, the axial supply passage RsA, the advance supply openings OAs, the limiting groove 512, the advance supply recess HAs, the advance openings OA and the advance passages 302 of the advance supply passage RAs. At this time, the oil pump 8 is communicated with the retard chambers 201 through the retard supply passage RRs. As a result, the hydraulic oil can be supplied from the oil pump 8 to the retard chambers 201 and the advance chambers 202 through the retard supply passage RRs and the advance supply passage RAs. However, the retard drain passage RRd and the advance drain passage RAd are closed, i.e., are blocked by the spool 60. Therefore, the hydraulic oil is not discharged from the retard chambers 201 and the advance chambers 202 to the oil pan 7.

When the spool 60 is in contact with the sleeve sealing portion 51 (see FIGS. 11 and 12), i.e., when the spool 60 is positioned at the other end of the stroke range, the retard chambers 201 are communicated with the oil pan 7 through the retard passages 301, the retard openings OR, the retard drain recess HRd and the drain openings Od1, Od2 of the retard drain passage RRd. At this time, the oil pump 8 is communicated with the advance chambers 202 through the advance supply passage RAs. As a result, the hydraulic oil can be discharged from the retard chambers 201 to the oil pan 7 through the retard drain passage RRd, and the hydraulic oil can be supplied from the oil pump 8 to the advance chambers 202 through the advance supply passage RAs.

A filter 58 is installed at an inside of the sleeve sealing portion 51 side end region of the outer sleeve 40, i.e., the filter 58 is installed at the middle of the retard supply passage RRs and the advance supply passage RAs. The filter 58 is, for example, a mesh that is shaped in a circular disk form. The filter 58 can capture foreign objects contained in the hydraulic oil. Therefore, it is possible to limit flow of the foreign objects toward the downstream side of the filter 58, i.e., toward the side that is opposite from the oil pump 8.

Figure 5:
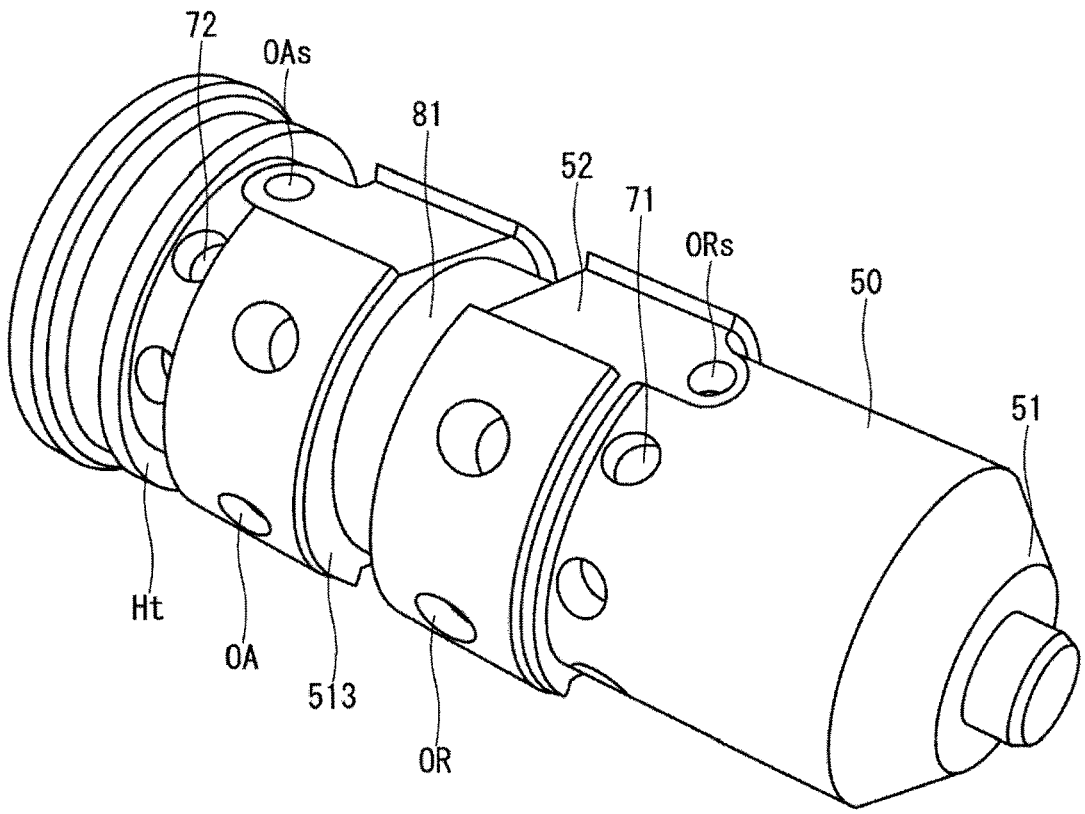
FIG. 5 is a perspective view illustrating an inner sleeve of the valve timing adjustment device according to the first embodiment.
Figure 6:
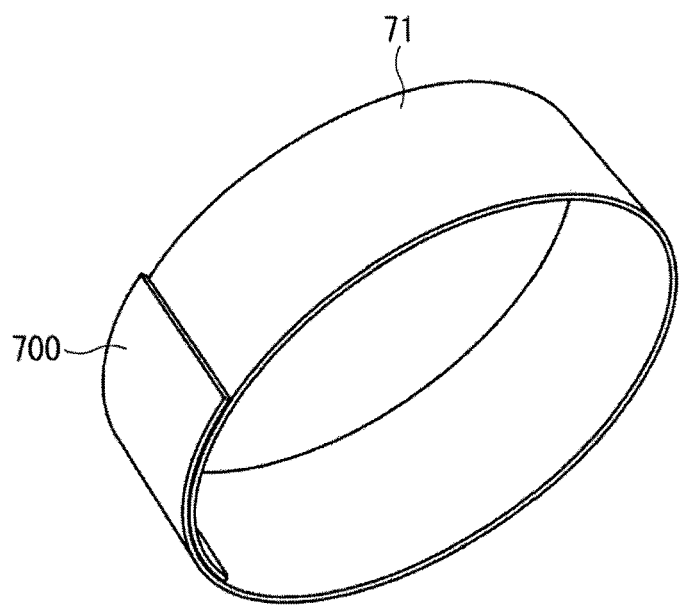
FIG. 6 is a perspective view illustrating a retard supply check valve of the valve timing adjustment device according to the first embodiment.

The retard supply check valve 71 is formed by rolling a rectangular metal thin plate such that a longitudinal direction of the rectangular metal thin plate coincides with the circumferential direction, so that the retard supply check valve 71 is shaped in a substantially cylindrical tubular form. FIG. 5 is a perspective view of the retard supply check valve 71.

The retard supply check valve 71 has an overlap portion 700.

The overlap portion 700 is formed at one circumferential end portion of the retard supply check valve 71. The overlap portion 700 is formed to overlap with a radially outer side of the other circumferential end portion of the retard supply check valve 71 (see FIG. 5).

The retard supply check valve 71 is installed in the limiting groove 511. The retard supply check valve 71 is installed such that the retard supply check valve 71 is resiliently deformable in the radial direction in the limiting groove 511. The retard supply check valve 71 is located on the radially inner side of the retard supply openings ORs in the radial direction of the inner sleeve 50. The retard supply check valve 71 is installed in the limiting groove 511 as follows. That is, in a state where the hydraulic oil does not flow in the retard supply passage RRs, i.e., in a state where an external force is not applied to the retard supply check valve 71, the overlap portion 700 overlaps with the other circumferential end portion of the retard supply check valve 71.

When the hydraulic oil flows from the retard supply opening ORs side toward the retard supply recess HRs in the retard supply passage RRs, the retard supply check valve 71 is deformed such that the outer peripheral wall of the retard supply check valve 71 is radially inwardly urged by the hydraulic oil and shrinks radially inward, i.e., an inner diameter of the retard supply check valve 71 is reduced. In this way, the outer peripheral wall of the retard supply check valve 71 is spaced away from the retard supply openings ORs, and thereby the hydraulic oil can flow toward the retard supply recess HRs through the retard supply check valve 71. At this time, the overlap portion 700 maintains a state in which a part of the overlap portion 700 overlaps with the other end portion of the retard supply check valve 71 while a length of the overlapping range, in which the overlap portion 700 overlaps with the other end portion of the retard supply check valve 71, is increased.

When the flow rate of the hydraulic oil flowing through the retard supply passage RRs becomes lower than or equal to a predetermined value, the retard supply check valve 71 is deformed to expand radially outward, i.e., the inner diameter of the retard supply check valve 71 is increased. When the hydraulic oil flows from the retard supply recess HRs side toward the retard supply openings ORs, the inner peripheral wall of the retard supply check valve 71 is radially outwardly urged by the hydraulic oil. Thereby, the retard supply check valve 71 contacts the retard supply openings ORs. In this way, the flow of the hydraulic oil from the retard supply recess HRs side toward the retard supply openings ORs is limited.

As discussed above, the retard supply check valve 71 functions as a check valve such that the retard supply check valve 71 enables the flow of the hydraulic oil from the retard supply opening ORs side toward the retard supply recess HRs and limits the flow of the hydraulic oil from the retard supply recess HRs side toward the retard supply openings ORs. Specifically, the retard supply check valve 71 is located on the oil pump 8 side of the spool 60 of the hydraulic oil control valve 11 in the retard supply passage RRs, and the retard supply check valve 71 enables only the flow of the hydraulic oil from the oil pump 8 side toward the retard chambers 201.

Similar to the retard supply check valve 71, the advance supply check valve 72 is formed by rolling a rectangular metal thin plate such that a longitudinal direction of the rectangular metal thin plate coincides with the circumferential direction, so that the advance supply check valve 72 is shaped in a substantially cylindrical tubular form. The structure of the advance supply check valve 72 is similar to that of the retard supply check valve 71 and thus will not be described in detail.

The advance supply check valve 72 is installed in the limiting groove 512. The advance supply check valve 72 is installed such that the advance supply check valve 72 is resiliently deformable in the radial direction in the limiting groove 512. The advance supply check valve 72 is located on the radially inner side of the advance supply openings OAs in the radial direction of the inner sleeve 50. The advance supply check valve 72 is installed in the limiting groove 512 as follows. That is, in a state where the hydraulic oil does not flow in the advance supply passage RAs, i.e., in a state where an external force is not applied to the advance supply check valve 72, the overlap portion 700 overlaps with the other circumferential end portion of the advance supply check valve 72.

When the hydraulic oil flows from the advance supply opening OAs side toward the advance supply recess HAs in the advance supply passage RAs, the advance supply check valve 72 is deformed such that the outer peripheral wall of the advance supply check valve 72 is radially inwardly urged by the hydraulic oil and shrinks radially inward, i.e., an inner diameter of the advance supply check valve 72 is reduced. In this way, the outer peripheral wall of the advance supply check valve 72 is spaced away from the advance supply openings OAs, and thereby the hydraulic oil can flow toward the advance supply recess HAs through the advance supply check valve 72. At this time, the overlap portion 700 maintains a state in which a part of the overlap portion 700 overlaps with the other end portion of the advance supply check valve 72 while a length of the overlapping range, in which the overlap portion 700 overlaps with the other end portion of the advance supply check valve 72, is increased.

When the flow rate of the hydraulic oil flowing through the advance supply passage RAs becomes lower than or equal to a predetermined value, the advance supply check valve 72 is deformed to expand radially outward, i.e., the inner diameter of the advance supply check valve 72 is increased. When the hydraulic oil flows from the advance supply recess HAs side toward the advance supply openings OAs, the inner peripheral wall of the advance supply check valve 72 is radially outwardly urged by the hydraulic oil. Thereby, the advance supply check valve 72 contacts the advance supply openings OAs. In this way, the flow of the hydraulic oil from the advance supply recess HAs side toward the advance supply openings OAs is limited.

As discussed above, the advance supply check valve 72 functions as a check valve such that the advance supply check valve 72 enables the flow of the hydraulic oil from the advance supply opening OAs side toward the advance supply recess HAs and limits the flow of the hydraulic oil from the advance supply recess HAs side toward the advance supply openings OAs. Specifically, the advance supply check valve 72 is located on the oil pump 8 side of the spool 60 of the hydraulic oil control valve 11 in the advance supply passage RAs, and the advance supply check valve 72 enables only the flow of the hydraulic oil from the oil pump 8 toward the advance chambers 202.

The limiting grooves 511, 512 can respectively limit axial movement of the retard supply check valve 71 and the axial movement of the advance supply check valve 72.

As illustrated in FIG. 4, the number of the advance supply openings OAs formed at the inner sleeve 50 is five. The advance supply openings OAs are formed in a range approximately half of the entire circumferential extent of the inner sleeve 50. That is, the advance supply openings OAs are localized only in a predetermined fraction of the circumferential extent of the inner sleeve 50. Thus, when the hydraulic oil flows from the advance supply openings OAs toward the advance supply recess HAs, the advance supply check valve 72 is urged by the hydraulic oil against the side of the limiting groove 512 that is diametrically opposite to the advance supply openings OAs. In this way, removal of the advance supply check valve 72 from the limiting groove 512 can be limited. The limiting groove 512 can thus maintain the function of limiting the axial movement of the advance supply check valve 72.

Like the advance supply openings OAs, the number of the retard supply openings ORs formed at the inner sleeve 50 is five. The retard supply openings ORs are formed in the range approximately half of the entire circumferential extent of the inner sleeve 50. That is, the retard supply openings ORs are localized only in the predetermined fraction of the circumferential extent of the inner sleeve 50. Thus, when the hydraulic oil flows from the retard supply openings ORs toward the retard supply recess HRs, the retard supply check valve 71 is urged by the hydraulic oil against the side of the limiting groove 511 that is diametrically opposite to the retard supply openings ORs. In this way, removal of the retard supply check valve 71 from the limiting groove 511 can be limited. The limiting groove 511 can thus maintain the function of limiting the axial movement of the retard supply check valve 71.

Similar to the retard supply check valve 71, the recycle check valve 81 is formed by rolling a rectangular metal thin plate such that a longitudinal direction of the rectangular metal thin plate coincides with the circumferential direction, so that the recycle check valve 81 is shaped in a substantially cylindrical tubular form. The recycle check valve 81 is formed such that the outer diameter of the recycle check valve 81 is larger than the outer diameter of the retard supply check valve 71. The structure of the recycle check valve 81 is similar to that of the retard supply check valve 71 except a difference in the outer diameter, so that the structure of the recycle check valve 81 will not be described in detail.

The recycle check valve 81 is installed in the movement limiting portion 513, i.e., the recycle check valve 81 is installed along the recycle passage Rre. The recycle check valve 81 is installed such that the recycle check valve 81 is resiliently deformable in the radial direction in the movement limiting portion 513. The recycle check valve 81 is located on the radially outer side of the recycle openings Ore in the radial direction of the inner sleeve 50. The recycle check valve 81 is installed in the movement limiting portion 513 as follows. That is, in a state where the hydraulic oil does not flow in the recycle passage Rre, i.e., in a state where an external force is not applied to the recycle check valve 81, the overlap portion 700 overlaps with the other circumferential end portion of the recycle check valve 81.

When the hydraulic oil flows from the recycle opening Ore side toward the axial supply passage RsA in the recycle passage Rre, the recycle check valve 81 is deformed such that the inner peripheral wall of the recycle check valve 81 is radially outwardly urged by the hydraulic oil and expands radially outward, i.e., an inner diameter of the recycle check valve 81 is increased. In this way, the inner peripheral wall of the recycle check valve 81 is spaced away from the recycle openings Ore, and thereby the hydraulic oil can flow toward the axial supply passage RsA through the recycle check valve 81. At this time, the overlap portion 700 maintains a state in which a part of the overlap portion 700 overlaps with the other end portion of the recycle check valve 81 while a length of the overlapping range, in which the overlap portion 700 overlaps with the other end portion of the recycle check valve 81, is reduced.

When the flow rate of the hydraulic oil flowing through the recycle passage Rre becomes lower than or equal to a predetermined value, the recycle check valve 81 is deformed to shrink radially inward, i.e., the inner diameter of the recycle check valve 81 is reduced. When the hydraulic oil flows from the axial supply passage RsA side toward the recycle openings Ore, the outer peripheral wall of the recycle check valve 81 is radially inwardly urged by the hydraulic oil and contacts the recycle openings Ore. In this way, the flow of the hydraulic oil from the axial supply passage RsA side toward the recycle openings Ore is limited.

As discussed above, the recycle check valve 81 functions as a check valve such that the recycle check valve 81 enables the flow of the hydraulic oil from the recycle opening Ore side toward the axial supply passage RsA and limits the flow of the hydraulic oil from the axial supply passage RsA side toward the recycle openings Ore. That is, the recycle check valve 81 enables only the flow of the hydraulic oil from the drain passage side toward the retard supply passage RRs and the advance supply passage RAs in the recycle passage Rre.

The movement limiting portion 513 can limit axial movement of the recycle check valve 81.

A linear solenoid 9 is located on the opposite side of the spool 60, which is opposite to the camshaft 3. The linear solenoid 9 is configured to contact the spool sealing portion 62. When the linear solenoid 9 is energized, the linear solenoid 9 urges the spool 60 toward the camshaft 3 through the spool sealing portion 62 against the urging force of the spring 63. As a result, the position of the spool 60 in the axial direction with respect to the sleeve 400 changes in the stroke range.

The variable volume space Sv is communicated with the retard drain passage RRd and the advance drain passage RAd. The variable volume space Sv is thus open to the atmosphere through the drain openings Od2 of the retard drain passage RRd and the advance drain passage RAd. As a result, the pressure in the variable volume space Sv can be made equal to the atmospheric pressure. This enables smooth movement of the spool 60 in the axial direction.

Next, a change in the flow of the hydraulic oil induced by a change in the position of the spool 60 relative to the sleeve 400 will be described with reference to FIGS. 7 to 12.

Figure 7:
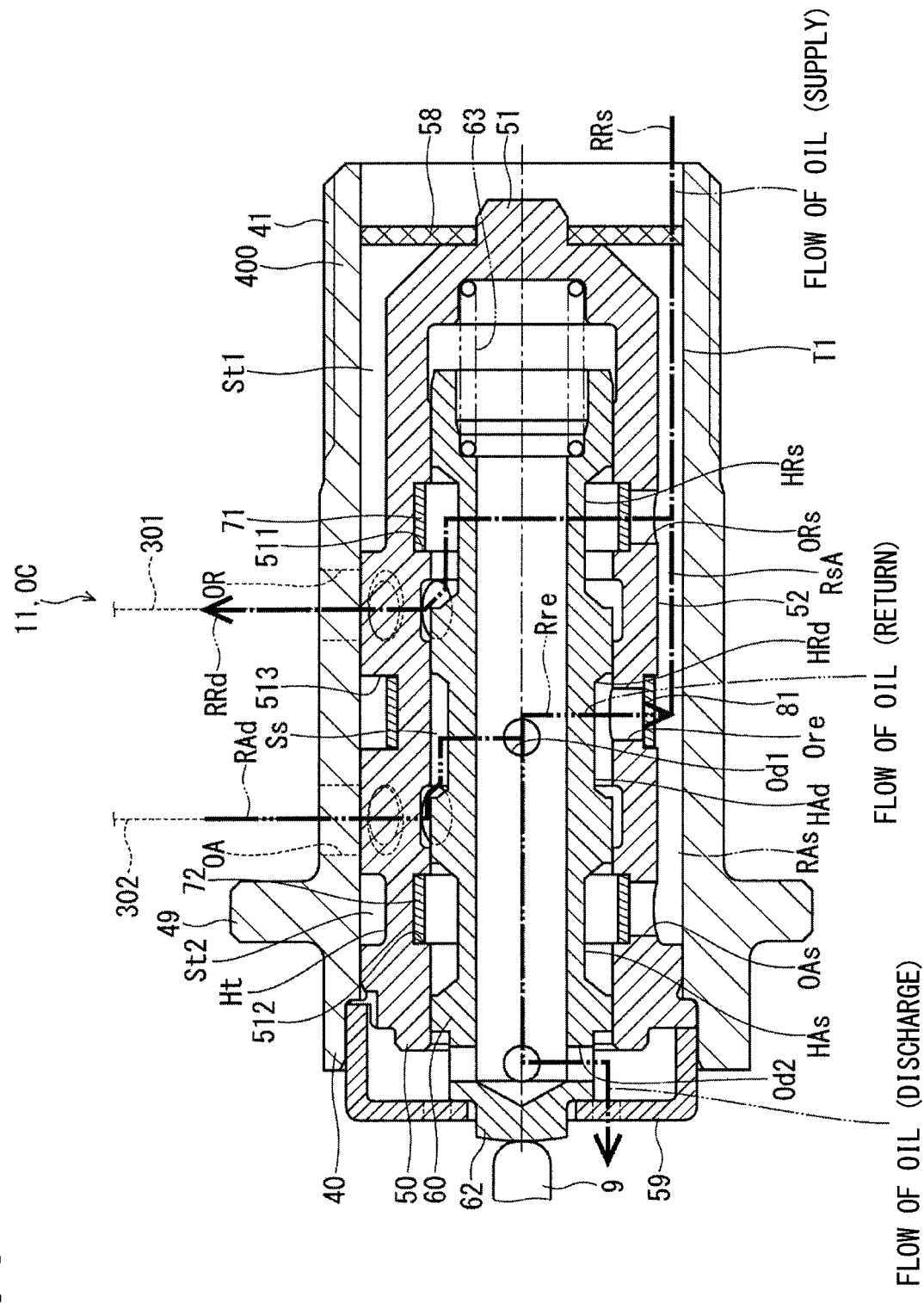
FIG. 7 is a cross-sectional view illustrating the hydraulic oil control valve of the valve timing adjustment device according to the first embodiment in a state where a spool is at one end of a stroke range.
Figure 8:
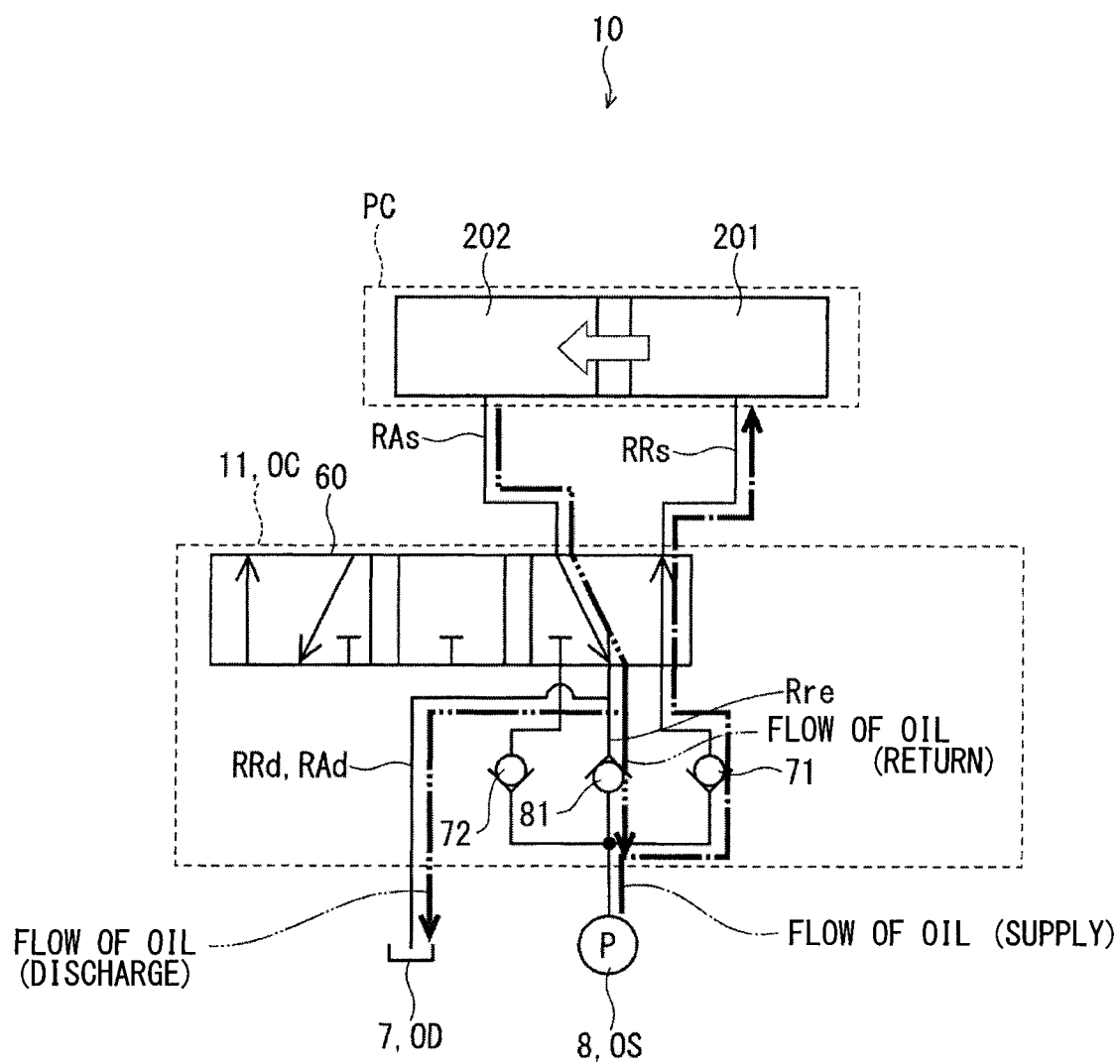
FIG. 8 is a schematic view illustrating the valve timing adjustment device according to the first embodiment in the state where the spool is at the one end of the stroke range.

As shown in FIGS. 7 and 8, when the spool 60 is in contact with the retaining portion 59, i.e., when the spool 60 is positioned at the one end of the stroke range, the hydraulic oil is supplied from the oil pump 8 to the retard chambers 201 through the retard supply passage RRs. At this time, the hydraulic oil is discharged from the advance chambers 202 to the oil pan 7 through the advance drain passage RAd. Moreover, a portion of the hydraulic oil, which flows in the advance drain passage RAd, is returned to the axial supply passage RsA and the retard supply passage RRs through the recycle passage Rre. As a result, the hydraulic oil, which is discharged from the advance chambers 202, can be reused. At this time, the recycle check valve 81 limits backflow of the hydraulic oil from the axial supply passage RsA side toward the drain passage in the recycle passage Rre.

Figure 9:
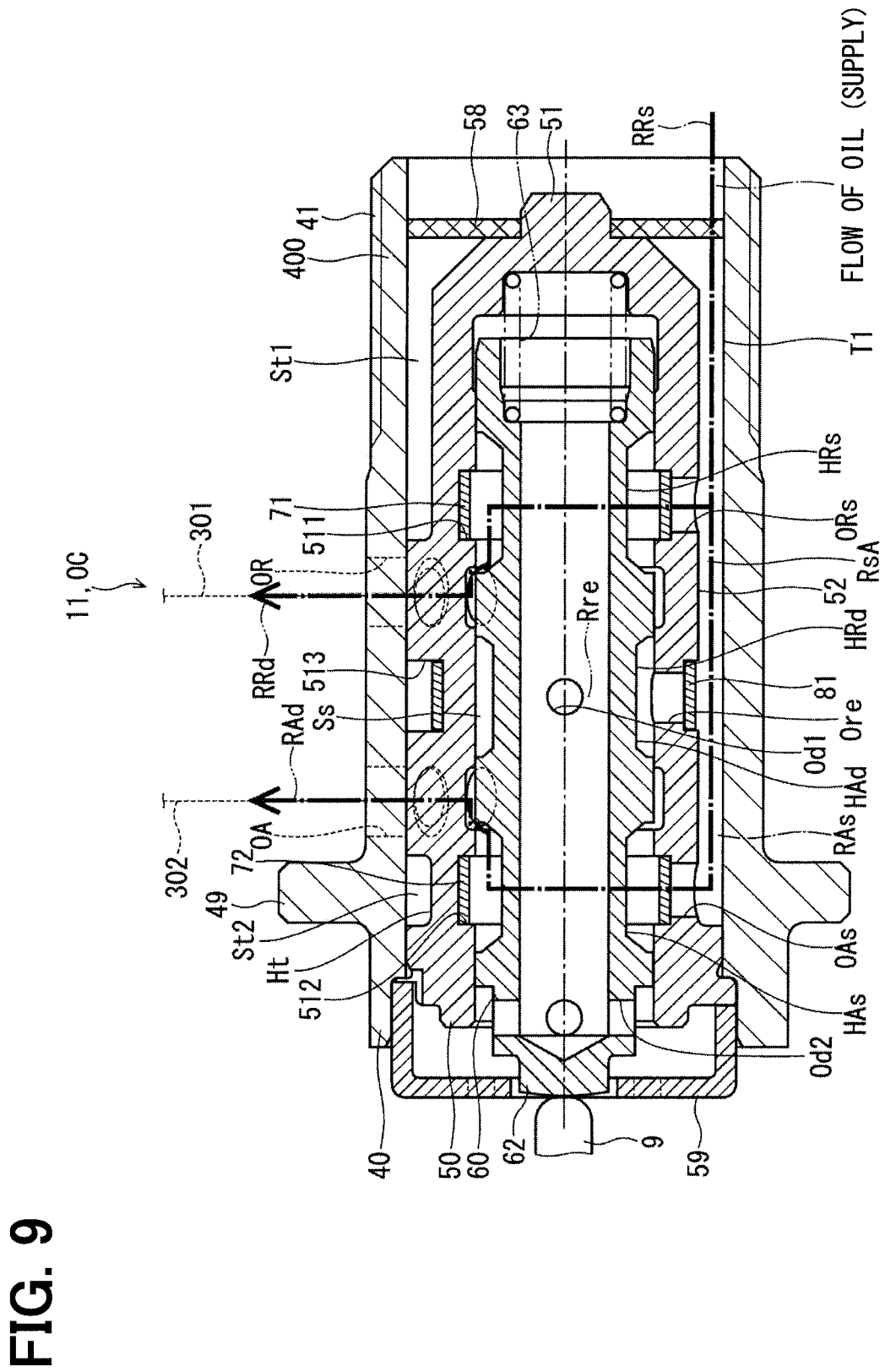
FIG. 9 is a cross-sectional view illustrating the hydraulic oil control valve of the valve timing adjustment device according to the first embodiment in a state where the spool is at an intermediate position of the stroke range.
Figure 10:
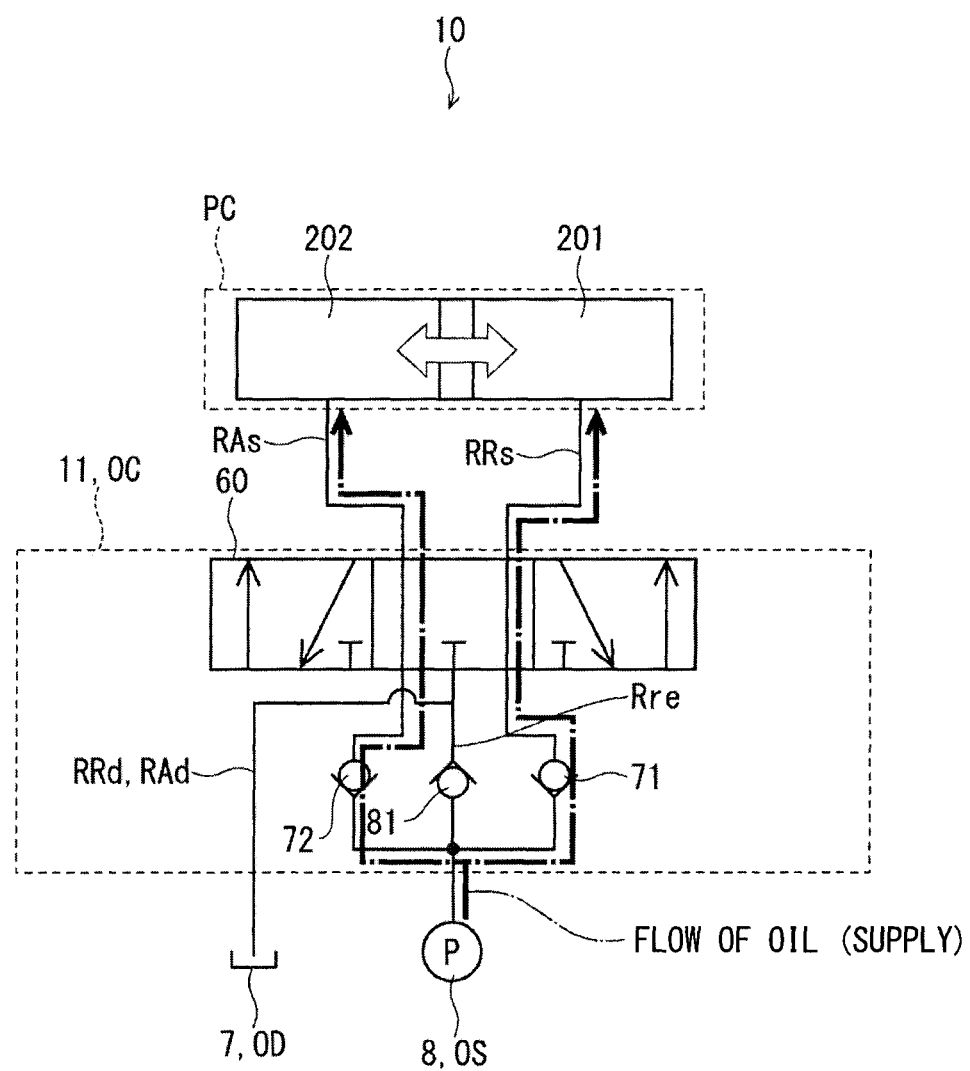
FIG. 10 is a schematic view illustrating the valve timing adjustment device according to the first embodiment in the state where the spool is at the intermediate position of the stroke range.

As shown in FIGS. 9 and 10, when the spool 60 is positioned between the retaining portion 59 and the sleeve sealing portion 51, i.e., when the spool 60 is positioned in the middle of the stroke range, the hydraulic oil is supplied from the oil pump 8 to the retard chambers 201 through the retard supply passage RRs. At this time, the hydraulic oil is supplied from the oil pump 8 to the advance chambers 202 through the advance supply passage RAs. At this time, the retard drain passage RRd and the advance drain passage RAd are closed by the spool 60, so that the hydraulic oil does not flow to the drain passage and is not returned to the axial supply passage RsA through the recycle passage Rre.

Figure 11:
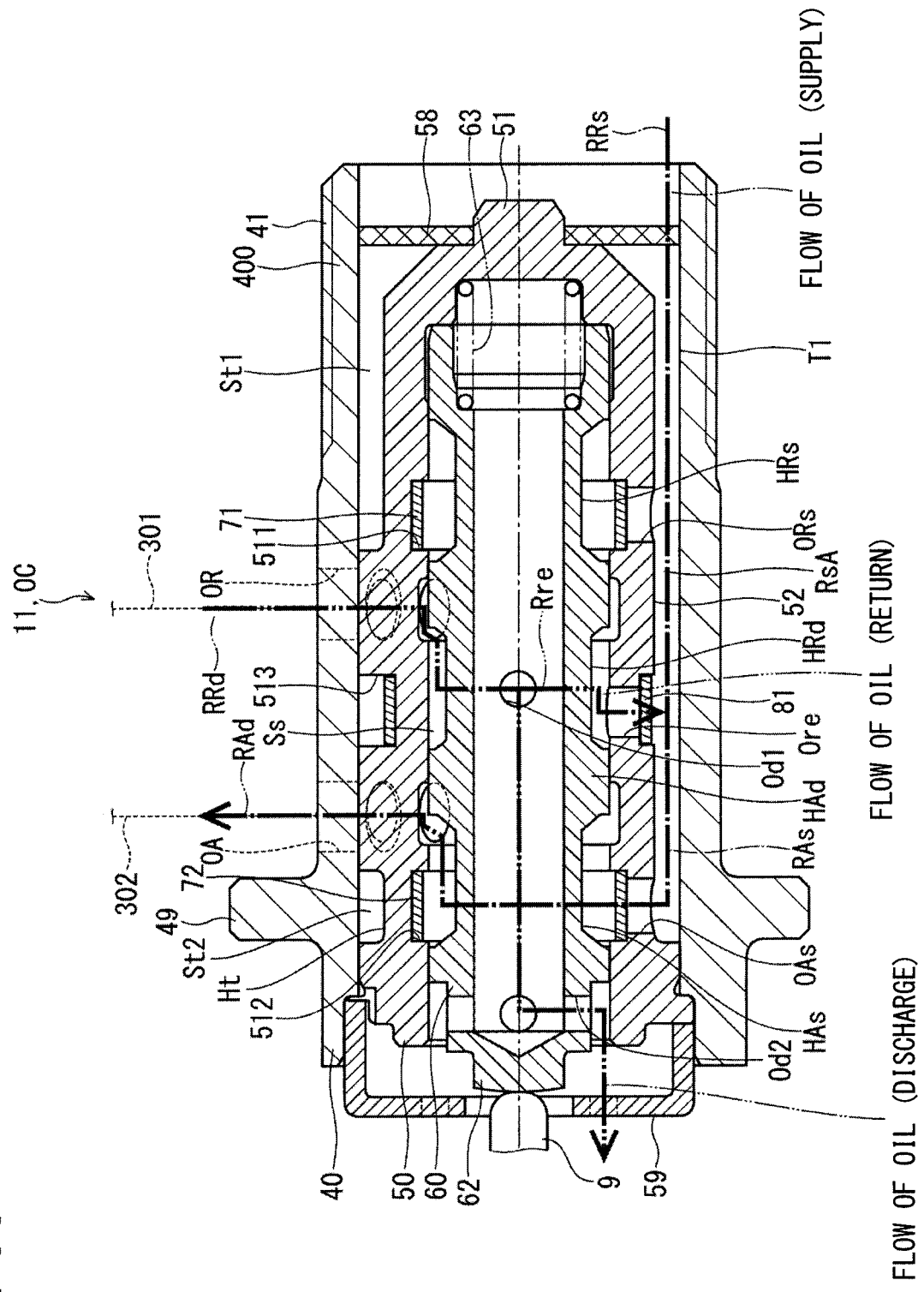
FIG. 11 is a cross-sectional view illustrating the hydraulic oil control valve of the valve timing adjustment device according to the first embodiment in a state where the spool is at the other end of the stroke range.
Figure 12:
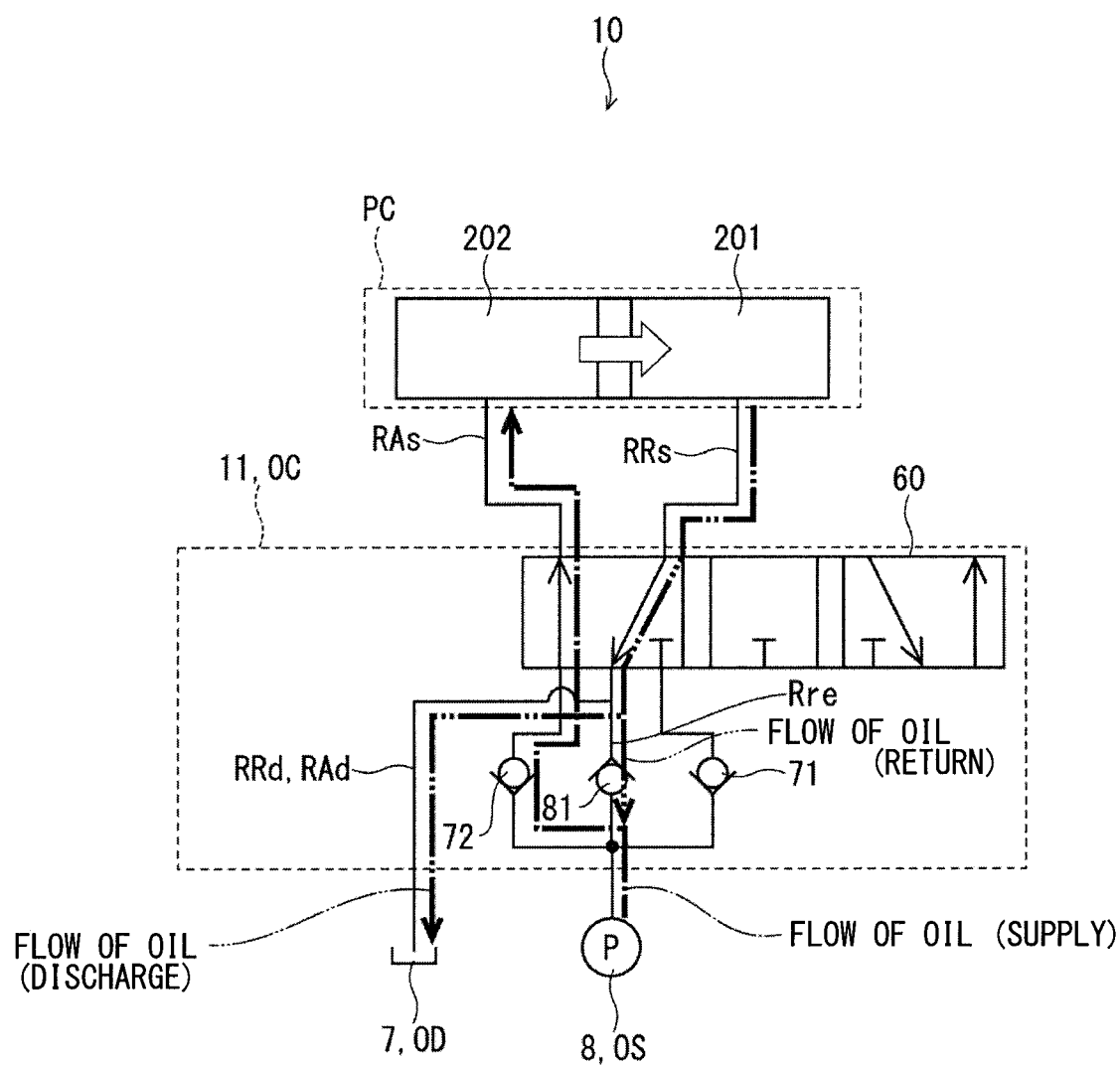
FIG. 12 is a schematic view illustrating the valve timing adjustment device according to the first embodiment in the state where the spool is at the other end of the stroke range.

As shown in FIGS. 11 and 12, when the spool 60 is in contact with the sleeve sealing portion 51, i.e., when the spool 60 is positioned at the other end of the stroke range, the hydraulic oil is supplied from the oil pump 8 to the advance chambers 202 through the advance supply passage RAs. At this time, the hydraulic oil is discharged from the retard chambers 201 to the oil pan 7 through the retard drain passage RRd. Moreover, a portion of the hydraulic oil, which flows in the retard drain passage RRd, is returned to the axial supply passage RsA and the advance supply passage RAs through the recycle passage Rre. As a result, the hydraulic oil, which is discharged from the retard chambers 201, can be reused. At this time, the recycle check valve 81 limits backflow of the hydraulic oil from the axial supply passage RsA side toward the drain passage in the recycle passage Rre.

The present embodiment is further provided with a lock pin 33 (see FIGS. 1 and 2). The lock pin 33 is shaped in a bottomed cylindrical tubular form. The lock pin 33 is received in a receiving hole 321 formed at the vane 32 in such a manner that the lock pin 33 can axially reciprocate in the receiving hole 321. A spring 34 is installed in an inside of the lock pin 33. The spring 34 urges the lock pin 33 toward the plate portion 222 of the case 22. A fitting recess 25 is formed at the plate portion 222 of the case 22 on the vane 32 side of the plate portion 222.

The lock pin 33 can be fitted into the fitting recess 25 when the vane rotor 30 is held at a most retarded position with respect to the housing 20. When the lock pin 33 is fitted into the fitting recess 25, relative rotation of the vane rotor 30 relative to the housing 20 is limited. On the other hand, when the lock pin 33 is not fitted into the fitting recess 25, the relative rotation of the vane rotor 30 relative to the housing 20 is enabled.

A pin control passage 304, which is communicated with a corresponding one of the advance chambers 202, is formed in the vane 32 at a location between the lock pin 33 and the advance chamber 202 (see FIG. 2). The pressure of the hydraulic oil, which flows from the advance chamber 202 into the pin control passage 304, is exerted in a removing direction for removing the lock pin 33 from the fitting recess 25 against the urging force of the spring 34.

In the valve timing adjustment device 10 constructed in the above-described manner, when the hydraulic oil is supplied to the advance chambers 202, the hydraulic oil flows into the pin control passage 304. Thereby, the lock pin 33 is removed from the fitting recess 25, and thereby the relative rotation of the vane rotor 30 relative to the housing 20 is enabled.

Next, the operation of the valve timing adjustment device 10 will be described. The valve timing adjustment device 10 drives the hydraulic oil control valve 11 among a first operating state, a second operating state and a phase holding state when the linear solenoid 9 is driven to urge the spool 60 of the hydraulic oil control valve 11. In the first operating state of the hydraulic oil control valve 11, the oil pump 8 is connected to the retard chambers 201, and the advance chambers 202 are connected to the oil pan 7. In the second operating state of the hydraulic oil control valve 11, the oil pump 8 is connected to the advance chambers 202, and the retard chambers 201 are connected to the oil pan 7. In the phase holding state of the hydraulic oil control valve 11, the oil pump 8 is connected to the retard chambers 201 and the advance chambers 202, and the connection of the retard chambers 201 to the oil pan 7 and the connection of the advance chambers 202 to the oil pan 7 are blocked to maintain the current phase of the phase converter PC.

In the first operating state, the hydraulic oil is supplied to the retard chambers 201 through the retard supply passage RRs, and the hydraulic oil is returned from the advance chambers 202 to the oil pan 7 through the advance drain passage RAd. In addition, the hydraulic oil is returned from the advance drain passage RAd to the retard supply passage RRs through the recycle passage Rre.

In the second operating state, the hydraulic oil is supplied to the advance chambers 202 through the advance supply passage RAs, and the hydraulic oil is returned from the retard chambers 201 to the oil pan 7 through the retard drain passage RRd. In addition, the hydraulic oil is returned from the retard drain passage RRd to the advance supply passage RAs through the recycle passage Rre.

In the phase holding state, the hydraulic oil is supplied to the retard chambers 201 and the advance chambers 202 through the retard supply passage RRs and the advance supply passage RAs, and the discharge of the hydraulic oil from the retard chambers 201 and the advance chambers 202 is limited.

The valve timing adjustment device 10 brings the hydraulic oil control valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the hydraulic oil control valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the hydraulic oil control valve 11 into the phase holding state when the rotational phase of the camshaft 3 coincides with the target value. In this way, the rotational phase of the camshaft 3 is maintained.

In the present embodiment, when the hydraulic oil control valve 11 is in the first operating state or the second operating state, the hydraulic oil is returned from the drain passage side to the retard supply passage RRs or the advance supply passage RAs through the recycle passage Rre. In this way, the hydraulic oil, which is discharged from the advance chambers 202 or the retard chambers 201, can be reused.

Moreover, when the hydraulic oil control valve 11 is in the first operating state or the second operating state, the recycle check valve 81 limits backflow of the hydraulic oil from each supply passage side toward the drain passage in the recycle passage Rre.

Furthermore, in the present embodiment, the hydraulic oil can be supplied to the retard chambers 201 and the advance chambers 202 even when the hydraulic oil control valve 11 is in the phase holding state, i.e., when the current phase of the phase converter PC is maintained. In other words, at the time of maintaining the current phase of the phase converter PC, the hydraulic oil control valve 11 can maintain the supply of the hydraulic oil to the retard chambers 201 and the advance chambers 202 to limit phase fluctuations of the phase converter PC, which would be caused by the air drawn into the retard chambers 201 and the advance chambers 202.

As described above, according to the present embodiment, there is provided the valve timing adjustment device 10, which adjusts the valve timing of the intake valves 4 of the engine 1 and includes the phase converter PC, the hydraulic oil supply source OS, the hydraulic oil controller OC, the oil discharge portion OD, the retard supply passage RRs, the advance supply passage RAs, the retard drain passage RRd and the advance drain passage RAd (serving as the drain passages), the recycle passage Rre, and the recycle check valve 81.

The phase converter PC has the retard chambers 201 and the advance chambers 202.

The hydraulic oil supply source OS is configured to supply the hydraulic oil to the retard chambers 201 and the advance chambers 202.

The hydraulic oil controller OC is configure to control the hydraulic oil, which is supplied from the hydraulic oil supply source OS to the retard chambers 201 and the advance chambers 202.

The oil discharge portion OD is configured to receive the hydraulic oil discharged from the retard chambers 201 or the advance chambers 202.

The retard supply passage RRs connects between the hydraulic oil supply source OS and the retard chambers 201 through the hydraulic oil controller OC.

The advance supply passage RAs connects between the hydraulic oil supply source OS and the advance chambers 202 through the hydraulic oil controller OC.

The retard drain passage RRd and the advance drain passage RAd connect the retard chambers 201 and the advance chambers 202 to the oil discharge portion OD.

The recycle passage Rre connects the retard drain passage RRd and the advance drain passage RAd to the retard supply passage RRs and the advance supply passage RAs. In this way, the hydraulic oil, which is discharged from the retard chambers 201 and the advance chambers 202, can be reused.

The recycle check valve 81 enables only the flow of the hydraulic oil from the drain passage side toward the retard supply passage RRs and the advance supply passage RAs in the recycle passage Rre. In this way, it is possible to limit the flow of the hydraulic oil from each supply passage side toward the drain passage, i.e., it is possible to limit the backflow of the hydraulic oil. Therefore, the responsiveness of the valve timing adjustment device 10 can be improved.

In the present embodiment, the recycle passage Rre is connected to the drain passage at the inside of the hydraulic oil controller OC. Thus, by forming the recycle passage Rre at the inside of the hydraulic oil controller OC, it is possible to eliminate an opening of the recycle passage Rre. Also, by forming the drain passage at the retard openings OR and advance openings OA, it is possible to eliminate openings of the drain passages. In this way, the number of openings of the passages formed at the outer wall of the hydraulic oil controller OC can be reduced. Thereby, a size of the hydraulic oil controller OC can be reduced in the direction, along which the openings are axially arranged one after the other along the hydraulic oil controller OC.

Furthermore, in the present embodiment, the hydraulic oil controller OC includes: the sleeve 400, which is shaped in the tubular form; the spool 60, which is shaped in the tubular form and is placed at the inside of the sleeve 400, while the spool 60 forms the specific space Ss between the spool 60 and the sleeve 400; the drain openings Od1, each of which is connected to the specific space Ss in the drain passage and extends from the specific space Ss in the radial direction of the sleeve 400 or the spool 60; and the recycle openings Ore, each of which is connected to the specific space Ss in the recycle passage Rre and extends from the specific space Ss toward the side that is opposite to the drain openings Od1.

The recycle passage Rre is connected to the drain passage in the specific space Ss.

The drain opening Od1 and the recycle opening Ore respectively extend in the opposite directions in the radial direction of the sleeve 400 or the spool 60. Thereby, the drain passage and the recycle passage Rre can be formed while limiting the interference therebetween at the inside of the hydraulic oil control valve 11.

In the present embodiment, at least the portion of the drain opening Od1 overlaps with the recycle opening Ore in the axial direction of the sleeve 400 or the spool 60. In this way, it is possible to reduce the length of the hydraulic oil control valve 11 in the axial direction.

Moreover, in the present embodiment, each drain opening Od1 is formed at the spool 60 such that the drain opening Od1 inwardly extends from the specific space Ss in the radial direction of the sleeve 400 or the spool 60.

Each recycle opening Ore is formed at the sleeve 400 such that the recycle opening Ore outwardly extends from the specific space Ss in the radial direction of the sleeve 400 or the spool 60.

As a result, the inner space, which has the pressure substantially equal to the atmospheric pressure, is formed at the center part of the hydraulic oil control valve 11, and the outer space, in which the pressurization takes place to supply the hydraulic oil, is formed on the outside of the inner space. Thus, the inner space and the outer space, which respectively have the different pressures, can be separated from each other as the two separate layers at the inside of the hydraulic oil control valve 11. Therefore, leakage of the hydraulic oil from the seal portion can be limited.

Furthermore, in the present embodiment, the spool 60 includes: the retard supply recess HRs that is radially inwardly recessed from the outer peripheral wall of the spool 60 and forms the portion of the retard supply passage RRs; the retard drain recess HRd that is radially inwardly recessed from the outer peripheral wall of the spool 60 and forms the portion of the retard drain passage RRd that communicates the retard chambers 201 to the oil discharge portion OD; the advance drain recess HAd that is radially inwardly recessed from the outer peripheral wall of the spool 60 and form the portion of the advance drain passage RAd that communicates the advance chambers 202 to the oil discharge portion OD; and the advance supply recess HAs that is radially inwardly recessed from the outer peripheral wall of the spool 60 and forms the portion of the advance supply passage RAs.

The retard supply recess HRs, the retard drain recess HRd, the advance drain recess HAd and the advance supply recess HAs are arranged one after the other in this order in the axial direction of the spool 60.

The retard drain recess HRd and the advance drain recess HAd are formed integrally and form the specific space Ss.

The recycle check valve 81 is placed to correspond with the recycle opening Ore.

As a result, the single recycle check valve 81 can achieve reuse of the hydraulic oil on both the retard side and the advance side.

In the present embodiment, the sleeve 400 includes the axial supply passage RsA that extends in the axial direction of the sleeve 400 in the retard supply passage RRs and the advance supply passage RAs.

When the hydraulic oil is supplied from the axial end portion of the sleeve 400, the axial supply passage RsA enables the smooth flow of the hydraulic oil to the retard supply passage RRs and the advance supply passage RAs. Moreover, the axial supply passage RsA can communicate between the retard supply passage RRs and the advance supply passage RAs at the inside of the hydraulic oil control valve 11.

Furthermore, in the present embodiment, the recycle passage Rre connects between the drain passage and the axial supply passage RsA. Thereby, the recycle passage Rre connects the drain passage to the retard supply passage RRs and the advance supply passage RAs.

Furthermore, in the present embodiment, the sleeve 400 includes: the outer sleeve 40; and the inner sleeve 50 that is placed at the inside of the outer sleeve 40.

The axial supply passage RsA is located at the interface T1 between the outer sleeve 40 and the inner sleeve 50. As a result, the axial supply passage RsA can easily be formed at the inside of the sleeve 400.

Furthermore, in the present embodiment, the inner peripheral wall of the outer sleeve 40 is shaped in the cylindrical form. The passage groove 52, which forms the axial supply passage RsA, is formed at the outer peripheral wall of the inner sleeve 50. In the present embodiment, the hardness of the outer sleeve 40 is set higher than the hardness of the inner sleeve 50.

Furthermore, in the present embodiment, the hardness of the outer sleeve 40 is higher than a hardness of a portion of the inner sleeve 50 while the hardness of the portion of the inner sleeve 50 is the lowest hardness in the inner sleeve 50. Accordingly, the passage, such as the axial supply passage RsA, can be easily formed at the inner sleeve 50 while the fastening function portion (the threaded portion 41) to be fastened to the other member is formed at the outer sleeve 40.

In the present embodiment, the recycle check valve 81 is formed such that the recycle check valve 81 is resiliently deformable in the radial direction. The recycle check valve 81 can thus have the simple structure, and the recycle check valve 81 can be installed to the small space and can reduce the pressure loss of the hydraulic oil.

In the present embodiment, the sleeve 400 includes the movement limiting portion 513 that is configured to limit the movement of the recycle check valve 81 in the axial direction. Therefore, it is possible to limit the positional deviation of the recycle check valve 81 from the recycle openings Ore, and thereby it is possible to limit the deterioration of the function of the recycle check valve 81 as the check valve.

Furthermore, the present embodiment is provided with the sleeve sealing portion 51.

The sleeve sealing portion 51 closes the one end of the inner sleeve 50 and forms the variable volume space Sv (having the volume that is variable) between the sleeve sealing portion 51 and the spool 60.

The variable volume space Sv is communicated with the drain passage. Therefore, the variable volume space Sv can be opened to the atmosphere through the drain passage. As a result, the pressure of the variable volume space Sv can be made equal to the atmospheric pressure, and thereby the smooth movement of the spool 60 in the axial direction is made possible.

Moreover, the space, which is formed at the inside of the spool 60, is shared between the path, which communicates the variable volume space Sv to the atmosphere, and the drain passage. Thereby, the size of the hydraulic oil control valve 11 can be reduced.

Furthermore, the present embodiment is provided with the housing 20.

The housing 20 forms the retard chambers 201 and the advance chambers 202. Specifically, the housing 20 forms the portion of the phase converter PC.

The hydraulic oil controller OC is placed such that at least the portion of the hydraulic oil controller OC is placed at the inside of the housing 20. As a result, the phase converter PC and the hydraulic oil controller OC can be provided integrally. Thereby, it is possible to limit the pressure loss of the hydraulic oil in the path from the hydraulic oil controller OC to the phase converter PC, and it is possible to reduce the size of the valve timing adjustment device 10.

Second Embodiment

Figure 13:
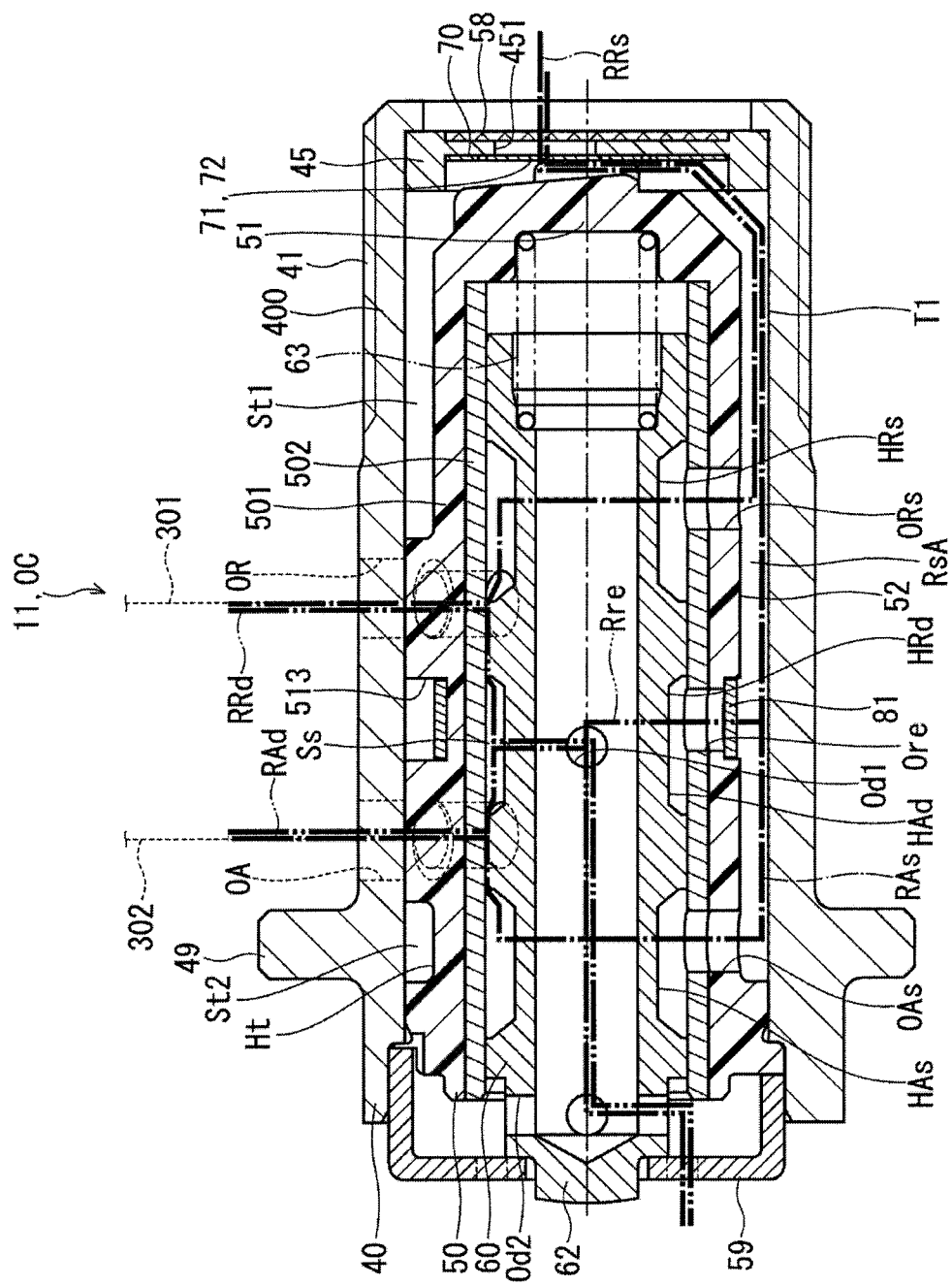
FIG. 13 is a cross-sectional view illustrating a valve timing adjustment device according to a second embodiment.

FIG. 13 illustrates a portion of a valve timing adjustment device according to a second embodiment. The second embodiment is different from the first embodiment with respect to the configuration of the hydraulic oil control valve 11.

In the second embodiment, the inner sleeve 50 includes a first inner sleeve 501 and a second inner sleeve 502.

The first inner sleeve 501 is shaped in a substantially cylindrical tubular form and is made of a material, such as resin, which has relatively low hardness.

Specifically, the first inner sleeve 501 is made of the material that has the hardness, which is lower than the hardness of the outer sleeve 40.

The second inner sleeve 502 is shaped in a substantially cylindrical tubular form and is made of a material, which includes, for example, iron and has relatively high hardness. Specifically, the second inner sleeve 502 is made of the material that has the hardness, which is higher than the hardness of the first inner sleeve 501.

The first inner sleeve 501 is placed at the inside of the outer sleeve 40 such that outer peripheral wall of the first inner sleeve 501 is fitted to the inner peripheral wall of the outer sleeve 40. The first inner sleeve 501 is immovable relative to the outer sleeve 40.

The second inner sleeve 502 is placed at the inside of the first inner sleeve 501 such that outer peripheral wall of the second inner sleeve 502 is fitted to the inner peripheral wall of the first inner sleeve 501. The second inner sleeve 502 is immovable relative to the first inner sleeve 501.

Each retard supply opening ORs extends in the radial direction of the sleeve 400 and connects the space, which is located at the inside of the second inner sleeve 502, to the annular space St1 and the axial supply passage RsA, which are located at the outside of the first inner sleeve 501. The limiting groove 511 is not formed at the second inner sleeve 502.

Each advance supply opening OAs extends in the radial direction of the sleeve 400 and connects the space, which is located at the inside of the second inner sleeve 502, to the annular space St2 and the axial supply passage RsA, which are located at the outside of the first inner sleeve 501. The limiting groove 512 is not formed at the second inner sleeve 502.

Each retard opening OR extends in the radial direction of the sleeve 400 and connects the space, which is located at the inside of the second inner sleeve 502, to the space, which is located at the outside of the outer sleeve 40.

Each advance opening OA extends in the radial direction of the sleeve 400 and connect the space, which is located at the inside of the second inner sleeve 502, to the space, which is located at the outside of the outer sleeve 40.

Each recycle opening Ore extends in the radial direction of the sleeve 400 and connects the space, which is located at the inside of the second inner sleeve 502, to the movement limiting portion 513 and the axial supply passage RsA. The movement limiting portion 513 is formed at the first inner sleeve 501.

The second embodiment is provided with a sealing body 45 and a reed valve 70.

The sealing body 45 is shaped in a plate form. The sealing body 45 is installed at the inside of the outer sleeve 40 such that the sealing body 45 closes the end portion of the outer sleeve 40 that is opposite to the retaining portion 59. The sealing body 45 has a passage hole 451. The passage hole 451 is formed to extend through the sealing body 45 in the thickness direction thereof. The retard supply passage RRs and the advance supply passage RAs are formed in the passage hole 451. The filter 58 is located on a side of the sealing body 45 that is away from the inner sleeve 50.

Figure 14:
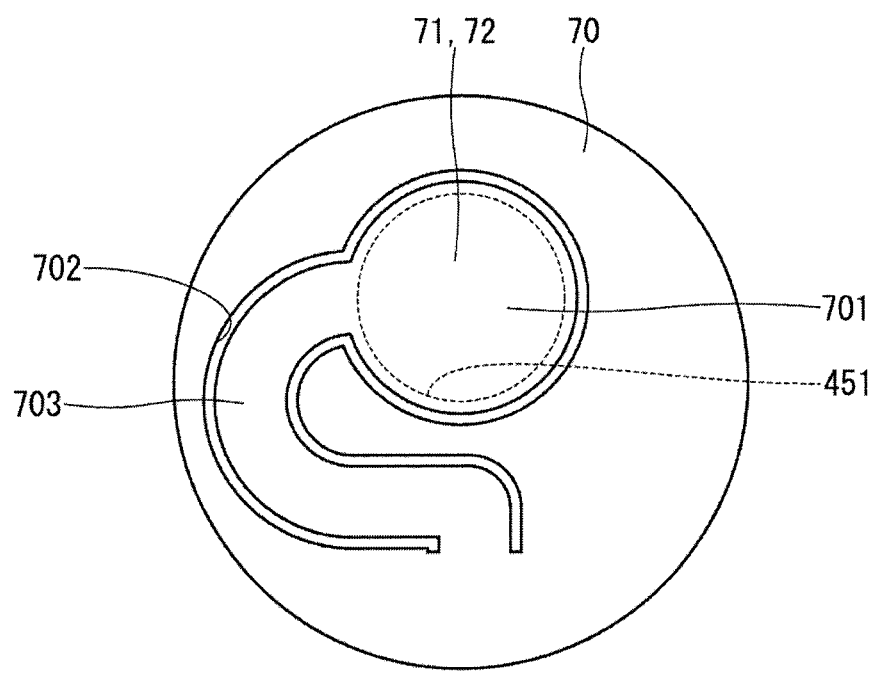
FIG. 14 is a plan view illustrating a reed valve of the valve timing adjustment device according to the second embodiment.

As illustrated in FIG. 14, the reed valve 70 is shaped in a circular disk form and is made of, for example, a metal thin plate. The reed valve 70 has an opening 702, a support portion 703, and a valve portion 701.

The opening 702 is formed to extend through the reed valve 70 in the thickness direction of the reed valve 70. The support portion 703 extends from an inner edge part of the opening 702 such that the support portion 703 extends within the opening 702. The valve portion 701 is shaped in a circular form. The valve portion 701 is formed integrally with the support portion 703 such that the valve portion 701 is connected to a distal end of the support portion 703. The support portion 703 supports the valve portion 701. In the reed valve 70, the valve portion 701 and the support portion 703 are resiliently deformable.

The valve portion 701 corresponds to the retard supply check valve 71 and the advance supply check valve 72. Specifically, in the present embodiment, the retard supply check valve 71 and the advance supply check valve 72 are integrally formed in the reed valve 70.

The reed valve 70 is installed to the inner sleeve 50 side surface of the sealing body 45 such that the valve portion 701 corresponds to the passage hole 451.

When the hydraulic oil flows from the passage hole 451 side toward the inner sleeve 50 in the retard supply passage RRs or the advance supply passage RAs, the valve portion 701 is urged toward the inner sleeve 50 by the hydraulic oil. At this time, the support portion 703 and the valve portion 701 are resiliently deformed such that the valve portion 701 is spaced away from the passage hole 451. In this way, the flow of the hydraulic oil from the passage hole 451 side toward the inner sleeve 50 is enabled.

In contrast, when the hydraulic oil flows from the inner sleeve 50 side toward the passage hole 451 in the retard supply passage RRs or the advance supply passage RAs, the valve portion 701 is urged against the sealing body 45 and thereby closes the passage hole 451. In this way, the flow of the hydraulic oil from the inner sleeve 50 side toward the passage hole 451 is limited.

Other than the points described above, the structure of the second embodiment is similar to that of the first embodiment.

As described above, the inner sleeve 50 of the present embodiment includes the first inner sleeve 501 and the second inner sleeve 502 while the second inner sleeve 502 is placed at the inside of the first inner sleeve 501 and has the hardness higher than the hardness of the first inner sleeve 501. In this way, the passage can be easily formed at the first inner sleeve 501. Furthermore, the wear resistance of the inner peripheral wall of the second inner sleeve 502, which is configured to slide relative to the spool 60, can be improved.

Furthermore, in the present embodiment, the hardness of the outer sleeve 40 is higher than the hardness of the portion (the first inner sleeve 501) of the inner sleeve 50, which has the lowest hardness in the inner sleeve 50. Accordingly, the passage, such as the axial supply passage RsA, can be easily formed at the inner sleeve 50 (the first inner sleeve 501) while the fastening function portion (the threaded portion 41) to be fastened to the other member is formed at the outer sleeve 40.

Third Embodiment

Figure 15:
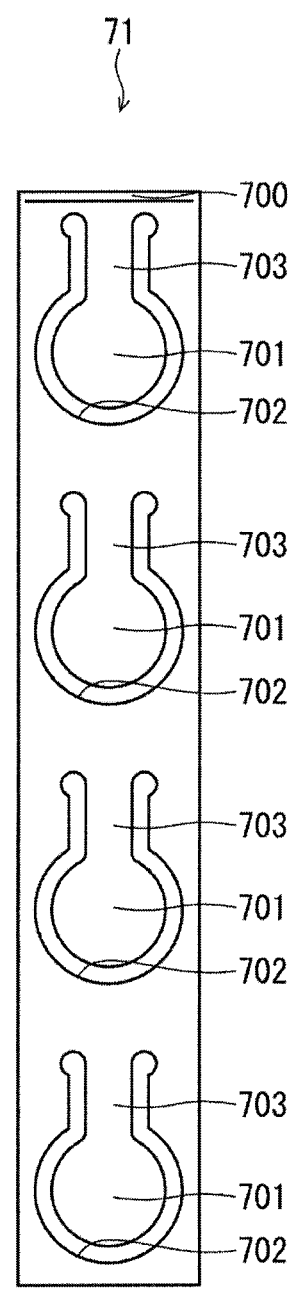
FIG. 15 is a developed view illustrating a retard supply check valve of a valve timing adjustment device according to a third embodiment.
Figure 16:
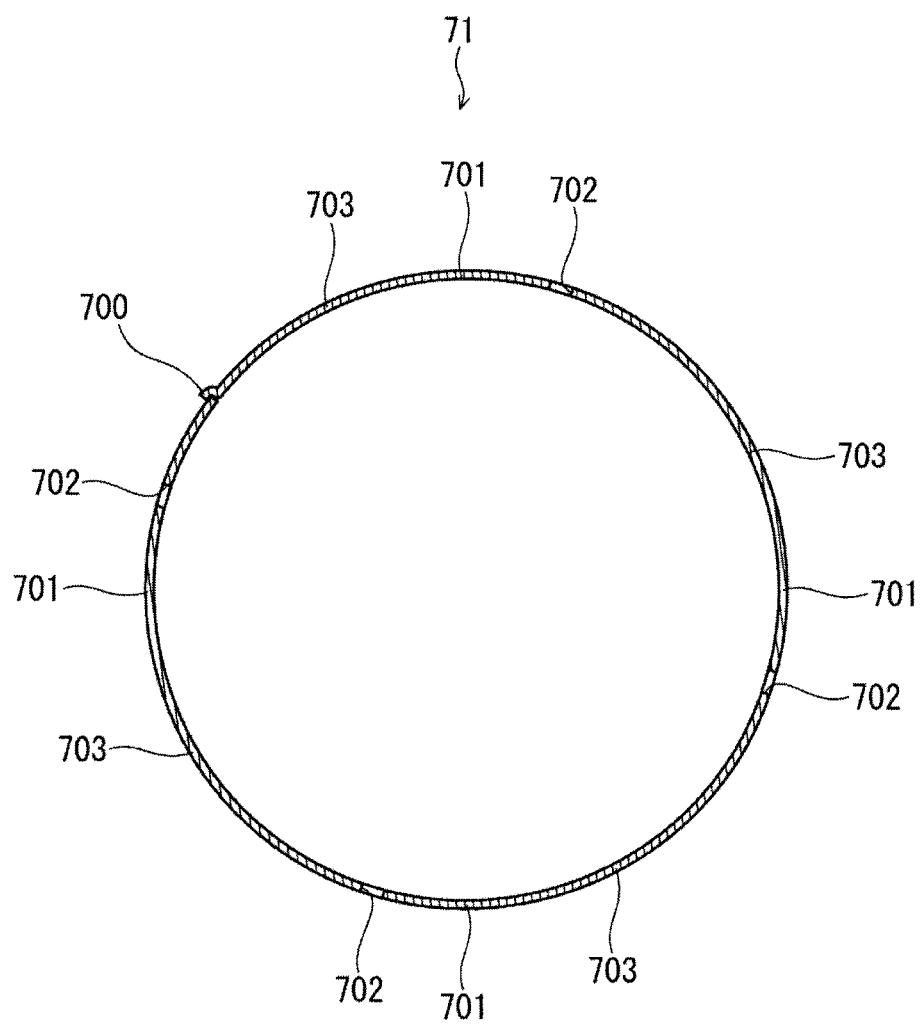
FIG. 16 is a cross-sectional view illustrating the retard supply check valve of the valve timing adjustment device according to the third embodiment.

A valve timing adjustment device according to a third embodiment will be described with reference to FIGS. 15 and 16. The third embodiment is different from the first embodiment with respect to the shapes of the retard supply check valve 71, the advance supply check valve 72, and the recycle check valve 81.

Similar to the first embodiment, the retard supply check valve 71 of the third embodiment is formed by rolling a rectangular metal thin plate such that a longitudinal direction of the rectangular metal thin plate coincides with the circumferential direction, so that the retard supply check valve 71 is shaped in a substantially cylindrical tubular form. FIG. 15 is a developed view of the retard supply check valve 71. FIG. 16 is a cross-sectional view of the retard supply check valve 71 at an intermediate position thereof in the axial direction.

In the third embodiment, the retard supply check valve 71 includes the overlap portion 700, a plurality of openings 702, a plurality of support portions 703, and a plurality of valve portions 701.

The overlap portion 700 is formed at one circumferential end portion of the retard supply check valve 71. The overlap portion 700 is formed to overlap with a radially outer side of the other circumferential end portion of the retard supply check valve 71 (see FIG. 15).

The number of the openings 702 is four, and these openings 702 are arranged one after the other at equal intervals in the circumferential direction of the retard supply check valve 71.

Each of the support portions 703 extends from an inner edge part of a corresponding one of the four openings 702 in the circumferential direction of the retard supply check valve 71.

Each valve portion 701 is connected to a distal end of the corresponding support portion 703. Here, the number of the valve portions 701 is four, and these valve portions 701 are arranged one after the other at equal intervals in the circumferential direction of the retard supply check valve 71.

The retard supply check valve 71 is installed in the limiting groove 511 of the inner sleeve 50. The retard supply check valve 71 is installed such that the support portions 703 and the valve portions 701 are resiliently deformable in the radial direction in the limiting groove 511. Here, the retard supply check valve 71 is formed such that the four valve portions 701 respectively correspond to the four retard supply openings ORs. Specifically, in the present embodiment, the number of the retard supply openings ORs is four, and these four retard supply opening ORs are arranged one after the other in the circumferential direction of the inner sleeve 50.

The structure of the advance supply check valve 72 is similar to that of the retard supply check valve 71, so that the structure of the advance supply check valve 72 will not be described in detail.

The advance supply check valve 72 is installed in the limiting groove 512 of the inner sleeve 50. The advance supply check valve 72 is installed such that the support portions 703 and the valve portions 701 are resiliently deformable in the radial direction in the limiting groove 512. Here, the advance supply check valve 72 is formed such that the four valve portions 701 respectively correspond to the four advance supply openings OAs. Specifically, in the present embodiment, the number of the advance supply openings OAs is four, and these four advance supply openings OAs are arranged one after the other in the circumferential direction of the inner sleeve 50.

The structure of the recycle check valve 81 is similar to that of the retard supply check valve 71 except a difference in the outer diameter, so that the structure of the recycle check valve 81 will not be described in detail.

The recycle check valve 81 is installed in the movement limiting portion 513 of the inner sleeve 50. The recycle check valve 81 is installed such that the support portions 703 and the valve portions 701 are resiliently deformable in the radial direction in the movement limiting portion 513. Here, the recycle check valve 81 is formed such that the four valve portions 701 respectively correspond to the four recycle openings Ore. Specifically, in the present embodiment, the number of the recycle openings Ore is four, and these four recycle openings Ore are arranged one after the other in the circumferential direction of the inner sleeve 50.

Other than the points described above, the structure of the third embodiment is similar to that of the first embodiment.

Fourth Embodiment

Figure 17:
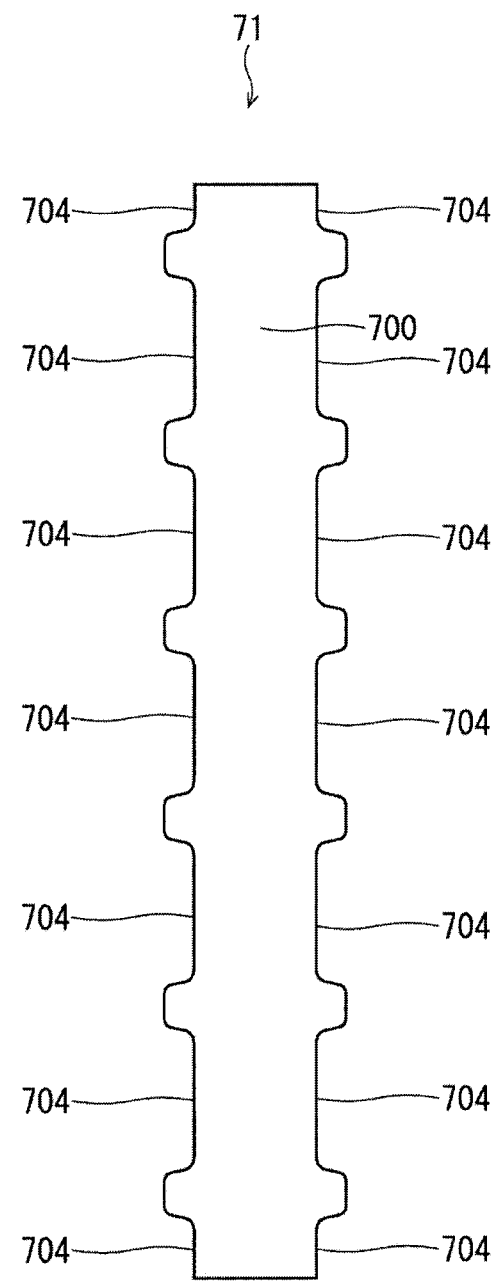
FIG. 17 is a developed view illustrating a retard supply check valve of a valve timing adjustment device according to a fourth embodiment.

A valve timing adjustment device according to a fourth embodiment will be described with reference to FIG. 17. The fourth embodiment is different from the first embodiment with respect to the shapes of the retard supply check valve 71, the advance supply check valve 72, and the recycle check valve 81.

Similar to the first embodiment, the retard supply check valve 71 of the fourth embodiment is formed by rolling a rectangular metal thin plate such that a longitudinal direction of the rectangular metal thin plate coincides with the circumferential direction, so that the retard supply check valve 71 is shaped in a substantially cylindrical tubular form. FIG. 17 is a developed view of the retard supply check valve 71.

In the fourth embodiment, the retard supply check valve 71 includes the overlap portion 700 and a plurality of cutouts 704.

The overlap portion 700 is formed at one circumferential end portion of the retard supply check valve 71. The overlap portion 700 is formed to overlap with a radially outer side of the other circumferential end portion of the retard supply check valve 71.

The cutouts 704 are formed at two opposite axial end portions of the retard supply check valve 71 by axially cutting the opposite axial end portions of the retard supply check valve 71. The plurality of the cutouts 704 is spaced from each other in the circumferential direction of the retard supply check valve 71.

The retard supply check valve 71 is installed in the limiting groove 511 of the inner sleeve 50. The retard supply check valve 71 is installed such that the retard supply check valve 71 is resiliently deformable in the radial direction in the limiting groove 511.

When the retard supply check valve 71 is radially inwardly deformed or is radially outwardly deformed, the hydraulic oil can flow through the cutouts 704. Therefore, the interference of the radial deformation of the retard supply check valve 71 by the hydraulic oil around the retard supply check valve 71 can be limited. As a result, the smooth operation of the opening/closing valve portions of the retard supply check valve 71 can be promoted.

The structure of the advance supply check valve 72 is similar to that of the retard supply check valve 71, so that the structure of the advance supply check valve 72 will not be described in detail.

The advance supply check valve 72 is installed in the limiting groove 512 of the inner sleeve 50. The advance supply check valve 72 is installed such that the advance supply check valve 72 is resiliently deformable in the radial direction in the limiting groove 512.

When the advance supply check valve 72 is radially inwardly deformed or is radially outwardly deformed, the hydraulic oil can flow through the cutouts 704. Therefore, the interference of the radial deformation of the advance supply check valve 72 by the hydraulic oil around the advance supply check valve 72 can be limited. As a result, the smooth operation of the opening/closing valve portions of the advance supply check valve 72 can be promoted.

The structure of the recycle check valve 81 is similar to that of the retard supply check valve 71 except a difference in the outer diameter, so that the structure of the recycle check valve 81 will not be described in detail.

The recycle check valve 81 is installed in the movement limiting portion 513 of the inner sleeve 50. The recycle check valve 81 is installed such that the recycle check valve 81 is resiliently deformable in the radial direction in the movement limiting portion 513.

When the recycle check valve 81 is radially inwardly deformed or is radially outwardly deformed, the hydraulic oil can flow through the cutouts 704. Therefore, the interference of the radial deformation of the recycle check valve 81 by the hydraulic oil around the recycle check valve 81 can be limited. As a result, the smooth operation of the opening/closing valve portions of the recycle check valve 81 can be promoted.

Other than the points described above, the structure of the sixth embodiment is similar to that of the first embodiment.

Other Embodiments

In another embodiment of the present disclosure, at least a portion of each drain opening Od1 does not need be formed to overlap with the recycle opening Ore in the axial direction of the sleeve 400 or the spool 60.

The above embodiment illustrates the example in which the passage groove 52 (the axial supply passage RsA) is formed at the interface T1 between the outer sleeve 40 and the inner sleeve 50 such that the passage groove 52 (the axial supply passage RsA) is radially inwardly recessed from the outer peripheral wall of the inner sleeve 50. On the other hand, in another embodiment of the present disclosure, the passage groove 52 may be formed at the interface T1 between the outer sleeve 40 and the inner sleeve 50 such that the passage groove 52 is radially outwardly recessed from the inner peripheral wall of the outer sleeve 40.

The first and second embodiments illustrate the example in which the outer sleeve 40 is made of the material containing iron, and the inner sleeve 50 is made of the material containing aluminum. On the other hand, in another embodiment of the present disclosure, the inner sleeve 50 may be made of any other material as long as such a material has the hardness that is lower than the harness of the outer sleeve 40. Furthermore, the outer sleeve 40 may be made of any other material as long as such a material has the hardness that is higher than the hardness of the inner sleeve 50. Moreover, the inner sleeve 50 does not need to be subjected to the surface hardening.

The second embodiment illustrates the example in which the outer sleeve 40 is made of the material containing iron, and the first inner sleeve 501 is made of resin, and the second inner sleeve 502 is made of the material containing iron. On the other hand, in another embodiment of the present disclosure, the first inner sleeve 501 may be made of any other material as long as such a material has the hardness that is lower than the hardness of the outer sleeve 40 and the hardness of the second inner sleeve 502. The outer sleeve 40 may be made of any other material as long as such a material has the hardness that is higher than the hardness of the first inner sleeve 501. The second inner sleeve 502 may be made of any other material as long as such a material has the hardness that is higher than the hardness of the first inner sleeve 501.

In another embodiment of the present disclosure, the hydraulic oil control valve 11 may be configured such that all parts of the hydraulic oil control valve 11 are located at the outside of the housing 20. In such a case, the threaded portion 41 may be eliminated from the outer sleeve 40. Also in this case, both the outer sleeve 40 and the inner sleeve 50 may be made of a material containing aluminum. In such a case, the material cost of the outer sleeve 40 and the inner sleeve 50 can be reduced while the required strength of the outer sleeve 40 and the inner sleeve 50 is ensured.

In another embodiment of the present disclosure, the housing 20 and the crankshaft 2 may be connected by a transmission member, such as a belt, in place of the chain 6.

The above embodiments illustrate the example in which the vane rotor 30 is fixed to the end portion of the camshaft 3, and the housing 20 is rotated synchronously with the crankshaft 2. On the other hand, in another embodiment of the present disclosure, the vane rotor 30 may be fixed to the end portion of the crankshaft 2, and the housing 20 may be rotated synchronously with the camshaft 3.

The valve timing adjustment device 10 of the present disclosure may adjust the valve timing of the exhaust valves 5 of the engine 1.

As discussed above, the present disclosure is not limited to the above embodiments and can be implemented in various forms without departing from the scope thereof.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A valve timing adjustment device configured to adjust a valve timing of a valve of an internal combustion engine, the valve timing adjustment device comprising:
a phase converter that has a retard chamber and an advance chamber;
a hydraulic oil supply source that is configured to supply hydraulic oil to the retard chamber and the advance chamber;
a hydraulic oil controller that is configured to control the hydraulic oil supplied from the hydraulic oil supply source to the retard chamber and the advance chamber;
an oil discharge portion that is configured to receive the hydraulic oil discharged from the retard chamber or the advance chamber;
a retard supply passage that connects between the hydraulic oil supply source and the retard chamber through the hydraulic oil controller;
an advance supply passage that connects between the hydraulic oil supply source and the advance chamber through the hydraulic oil controller;
a drain passage that connects the retard chamber and the advance chamber to the oil discharge portion;
a recycle passage that connects the drain passage to the retard supply passage and the advance supply passage; and
a recycle check valve that enables only a flow of the hydraulic oil from the drain passage toward the retard supply passage and the advance supply passage in the recycle passage and limits a flow of the hydraulic oil from the retard supply passage and the advance supply passage toward the drain passage in the recycle passage, wherein:
the recycle passage is connected to the drain passage at an inside of the hydraulic oil controller; and
the hydraulic oil controller includes:
a sleeve that is shaped in a tubular form and holds the recycle check valve, wherein a portion of the retard supply passage and a portion of the advance supply passage radially extend through a peripheral wall of the sleeve; and
a spool that is placed in an inside of the sleeve and is configured to reciprocate relative to the sleeve and the recycle check valve in an axial direction of the spool.

2. The valve timing adjustment device according to claim 1, wherein:
the spool is shaped in a tubular form and forms a specific space between the spool and the sleeve;
the hydraulic oil controller further includes:
a drain opening that is connected to the specific space in the drain passage and extends from the specific space in a radial direction of the sleeve or the spool; and
a recycle opening that is connected to the specific space in the recycle passage and extends from the specific space toward a side that is opposite to the drain opening; and
the recycle passage is connected to the drain passage in the specific space.

3. The valve timing adjustment device according to claim 2, wherein at least a portion of the drain opening overlaps with the recycle opening in an axial direction of the sleeve or the spool.

4. The valve timing adjustment device according to claim 2, wherein:

the drain opening is formed at the spool such that the drain opening inwardly extends from the specific space in the radial direction of the sleeve or the spool; and the recycle opening is formed at the sleeve such that the recycle opening outwardly extends from the specific space in the radial direction of the sleeve or the spool.

5. The valve timing adjustment device according to claim 2, wherein:

the spool includes:

a retard supply recess that is radially inwardly recessed from an outer peripheral wall of the spool and forms a portion of the retard supply passage;

a retard drain recess that is radially inwardly recessed from the outer peripheral wall of the spool and forms a portion of the drain passage that communicates the retard chamber to the oil discharge portion;

an advance drain recess that is radially inwardly recessed from the outer peripheral wall of the spool and forms a portion of the drain passage that communicates the advance chamber to the oil discharge portion; and an advance supply recess that is radially inwardly recessed from the outer peripheral wall of the spool and forms a portion of the advance supply passage;

the retard supply recess, the retard drain recess, the advance drain recess and the advance supply recess are arranged one after another in this order in an axial direction of the spool;

the retard drain recess and the advance drain recess are formed integrally and form the specific space, and the recycle check valve is placed to correspond with the recycle opening.

6. The valve timing adjustment device according to claim 2, wherein the sleeve includes an axial supply passage that extends in an axial direction of the sleeve in the retard supply passage and the advance supply passage.

7. The valve timing adjustment device according to claim 6, wherein the recycle passage connects between the drain passage and the axial supply passage.

8. The valve timing adjustment device according to claim 6, wherein:

the sleeve includes:

an outer sleeve; and an inner sleeve that is placed at an inside of the outer sleeve, and the axial supply passage is located at an interface between the outer sleeve and the inner sleeve.

9. The valve timing adjustment device according to claim 8, wherein:

one of an inner peripheral wall of the outer sleeve and an outer peripheral wall of the inner sleeve is shaped in a cylindrical form; and a passage groove, which forms the axial supply passage, is formed at another one of the inner peripheral wall of the outer sleeve and the outer peripheral wall of the inner sleeve.

10. The valve timing adjustment device according to claim 8, wherein the inner sleeve includes:

a first inner sleeve; and a second inner sleeve that is placed at an inside of the first inner sleeve, wherein the second inner sleeve has a hardness, which is higher than a hardness of the first inner sleeve.

11. The valve timing adjustment device according to claim 8, wherein a hardness of the outer sleeve is higher than a hardness of a portion of the inner sleeve while the hardness of the portion of the inner sleeve is a lowest hardness in the inner sleeve.

12. The valve timing adjustment device according to claim 1, wherein the recycle check valve is resiliently deformable in a radial direction.

13. The valve timing adjustment device according to claim 12, wherein the sleeve includes a movement limiting portion that is configured to limit movement of the recycle check valve in an axial direction.

14. The valve timing adjustment device according to claim 1, further comprising a sleeve sealing portion that closes one end of the sleeve and forms a variable volume space between the sleeve sealing portion and the spool while a volume of the variable volume space is variable, wherein the variable volume space is communicated with the drain passage.

15. The valve timing adjustment device according to claim 1, further comprising a housing that forms the retard chamber and the advance chamber, wherein at least a portion of the hydraulic oil controller is placed at an inside of the housing.

* * * * *